US009128585B2

(12) United States Patent
Weiner et al.

(10) Patent No.: US 9,128,585 B2
(45) Date of Patent: Sep. 8, 2015

(54) 3D RENDERING IN A ZUI ENVIRONMENT

(71) Applicants: Zsuzsa Weiner, Budapest (HU); Ádám Somlai-Fisher, Budapest (HU); Laszlo Pandy, San Francisco, CA (US); Ákos Tóth-Máté, Godollo (HU); Laszlo Laufer, Budapest (HU); David Udvardy, Budapest (HU); Vera Gergely, San Francisco, CA (US)

(72) Inventors: Zsuzsa Weiner, Budapest (HU); Ádám Somlai-Fisher, Budapest (HU); Laszlo Pandy, San Francisco, CA (US); Ákos Tóth-Máté, Godollo (HU); Laszlo Laufer, Budapest (HU); David Udvardy, Budapest (HU); Vera Gergely, San Francisco, CA (US)

(73) Assignee: Prezi, Inc., San Francisco, CA (US)

( * ) Notice: Subject to any disclaimer, the term of this patent is extended or adjusted under 35 U.S.C. 154(b) by 278 days.

(21) Appl. No.: 13/907,749

(22) Filed: May 31, 2013

(65) Prior Publication Data

US 2014/0359525 A1 Dec. 4, 2014

(51) Int. Cl.
*G09G 5/00* (2006.01)
*G06F 3/0481* (2013.01)
*G06F 3/0484* (2013.01)

(52) U.S. Cl.
CPC ........ *G06F 3/04815* (2013.01); *G06F 3/04847* (2013.01)

(58) Field of Classification Search
CPC .................. G06F 3/04815; G06F 3/04845
See application file for complete search history.

(56) References Cited

U.S. PATENT DOCUMENTS

| 7,707,503 | B2 | 4/2010 | Good et al. | |
|---|---|---|---|---|
| 8,872,813 | B2 * | 10/2014 | Walton et al. | 345/419 |
| 8,953,871 | B2 * | 2/2015 | Zomet | 382/154 |
| 2009/0265632 | A1 | 10/2009 | Russ et al. | |
| 2011/0304714 | A1 * | 12/2011 | Akifusa et al. | 348/54 |
| 2014/0317538 | A1 * | 10/2014 | Pollock et al. | 715/762 |

* cited by examiner

*Primary Examiner* — Charles Tseng
(74) *Attorney, Agent, or Firm* — Schwegman Lundberg & Woessner, P.A.

(57) ABSTRACT

An apparatus and method for 3D rendering of a canvas and at least a first background in a ZUI environment are disclosed herein. Within a viewing window, display at least a portion of the canvas and at least a portion of the first background in parallax. Receive a user action taken on the viewing window that triggers a change in the displaying of the canvas and the first background. Calculate a first transform value and a first transparency value for the first background, in response to the received user action. Update the display of the canvas and the first background in response to the received user action, the canvas updated in accordance with the received user action and the first background updated in accordance with the first transform value and the first transparency value.

28 Claims, 27 Drawing Sheets

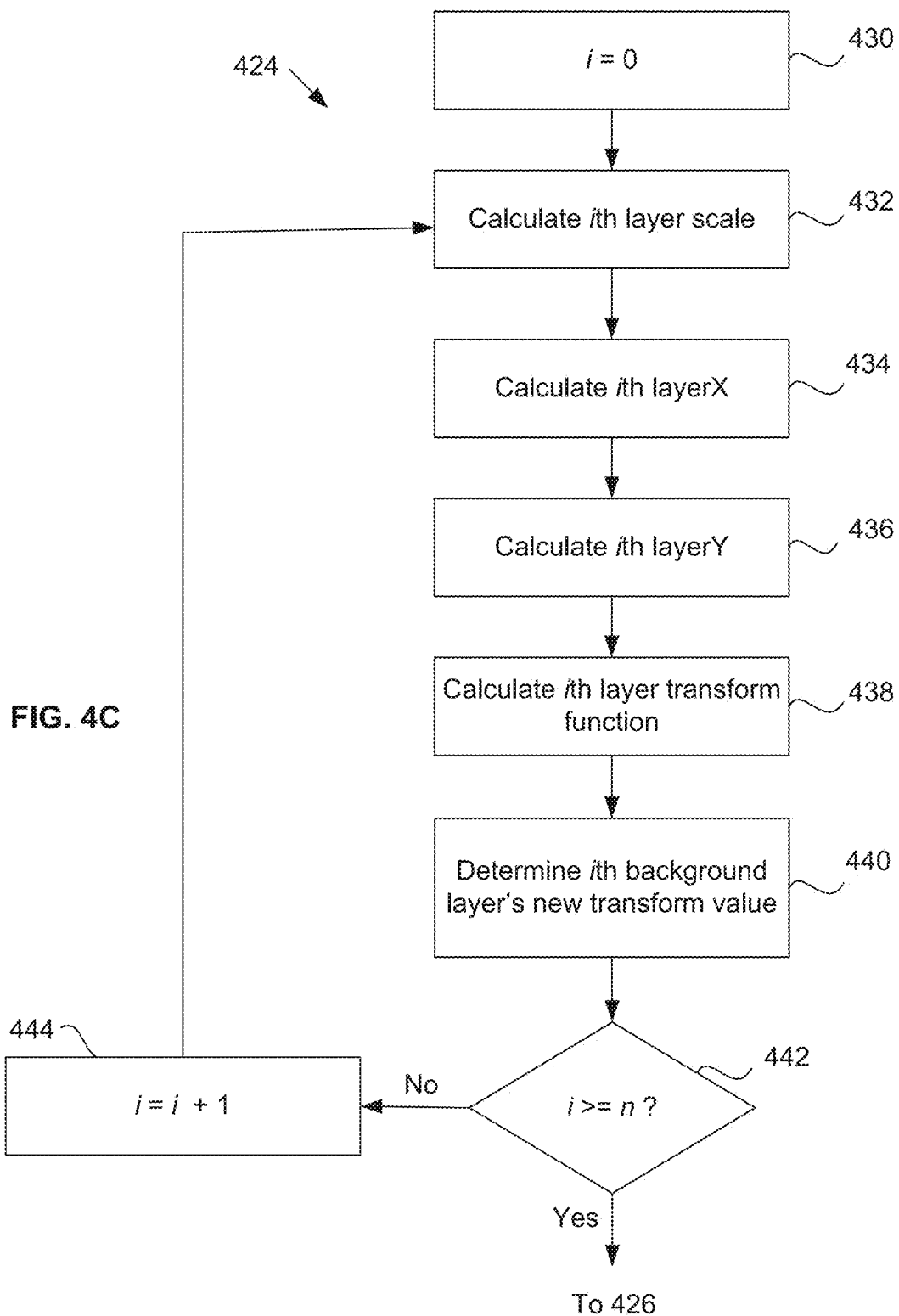

3D RENDERING IN A ZUI ENVIRONMENT

TECHNICAL FIELD

The present application relates generally to systems and methods for displaying content, and in particular, in some embodiments, for displaying content in a zooming user interface (ZUI) environment.

BACKGROUND

Content, such as text, images, video, graphics, or visual information, is created and/or displayed on two-dimensional (2D) screens. Background may be added to the content in order to facilitate overall visual presentation (e.g., provide a theme, add visual interest). When displaying content and background together in a 2D screen, there is a need to visually distinguish the content from the background. Otherwise the content and background may appear to be commingled together, and users have difficulty focusing on the content.

It would be beneficial to apply a three-dimensional (3D) effect for the content and background to visually distinguish the content from the background. It would be beneficial to apply one or more backgrounds at the same time to the content at anytime during creation or presentation of the content. It would further be beneficial to selectively apply a fade effect to the background(s). It would also be beneficial for 3D display of content and background to be automatically updated as content, background, and/or display parameters is updated. It would further be beneficial for computations to provide 3D display of the content and background to be quick and simple while providing a realistic 3D effect.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Some embodiments are illustrated by way of example and not limitations in the figures of the accompanying drawings, in which:

FIGS. 4A-4D illustrates flow diagrams showing functionalities or operations implemented by the modules of FIG. 3 according to some embodiments.

Figure 1:
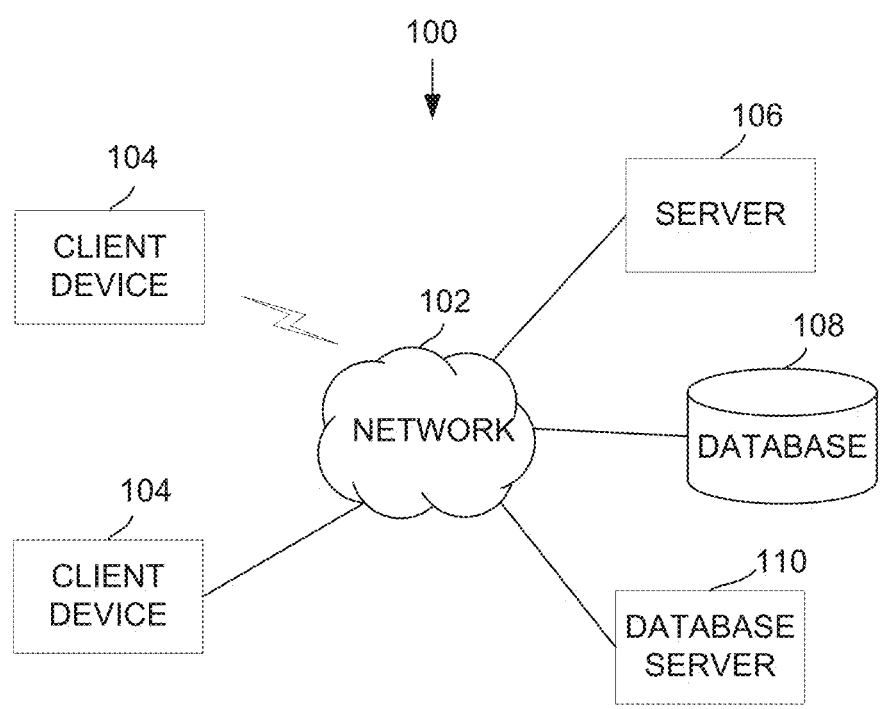
FIG. 1 illustrates a network diagram depicting an example system for providing 3D effect in a ZUI environment according to some embodiments.

The headings provided herein are for convenience only and do not necessarily affect the scope or meaning of the terms used.

DETAILED DESCRIPTION

Described in detail herein is an apparatus and method for achieving and maintaining the perception of visual perspective or depth (e.g., 3D effect) for backgrounds displayed with a canvas within a ZUI environment. The canvas and backgrounds are rendered in parallax and the rendering is updated in real-time (or near real-time) in response to user action taken on the canvas, such as, but not limited to, zooming in, zooming out, panning, or changing the size of the viewing window.

The perception of visual perspective or depth is created by sizing a second object that should be perceived as being further away than a first object smaller than the first object. In some embodiments, each of the backgrounds associated with a canvas is represented as being located in a different background imaging plane from each other and from the canvas imaging plane. The distance of each of the background imaging planes from the canvas imaging plane is calculated as a function of the viewing window or camera scale at which all content included in the canvas is visible at the same time within the viewing window. The size or scale of content included in the background imaging plane closest to the canvas imaging plane is larger than the size or scale of content included in the next background imaging plane closest to the canvas imaging plane, and so on.

In response to user actions taken in the ZUI environment, such as zooming in/out of the canvas, panning across the canvas, and/or changing the height of the viewing window, the perception of visual perspective or depth for the backgrounds relative to the canvas is maintained in accordance with layer transform and layer transparency calculations for each of the background imaging planes. The formulas for the layer transform and layer transparency calculations are simple and accordingly, minimum computation resources are needed. Layer transform and layer transparency calculations comprise: determining the size or scaling of each of the background imaging plane is a function of the current viewing window scale, the height of the current viewing window, and the viewing window scale at which all content of the canvas is visible simultaneously within the viewing window. The horizontal and vertical coordinate position of each of the background is a function of the horizontal and vertical coordinate position of the current viewing window relative to the canvas. The degree of transparency/opacity of each of the backgrounds is a function of the current viewing window scale, height of the current viewing window, viewing window scale at which all content of the canvas is visible simultaneously within the viewing window, and the position order of the background imaging plane relative to the other background imaging planes.

The following description is presented to enable any person skilled in the art to create and use a computer system configuration and related method and article of manufacture to provide and update 3D rendering of a canvas and one or more backgrounds in a ZUI environment. Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

FIG. 1 illustrates an example system 100 for providing 3D effect in a zooming user interface (ZUI) environment according to some embodiments. The system 100 includes a network 102, a plurality of client devices 104, a server 106, a database 108, and a database server 110. Each of the client devices 104, server 106, database 108, and database server 110 is in communication with the network 102.

The network 102 comprises a wired and/or wireless communications network such as, but not limited to, a WiFi network, a WiMax network, a local area network (LAN), a wide area network (WAN), a metropolitan area network (MAN), a wireless local area network (WLAN), a wireless wide area network (WWAN), a wireless metropolitan area network (WMAN), a wireless virtual private network (WVPN), an ad hoc network, an intranet, an extranet, a virtual private network (VPN), a portion of the Internet, the Internet, a portion of a public switched telephone network (PSTN), a cellular network, or a combination of two or more such networks. When the network 102 comprises a public network, security features (e.g., VPN/SSL secure transport) may be included to ensure authorized access within the system 100. Although not shown, the network 102 can include, without limitation, servers, databases, switches, routers, base stations, repeaters, software, firmware, intermediating servers, and/or other components to facilitate communication between devices in the system 100. The network 102 may comprise one or more networks, for example, a cellular network in communication with the Internet.

Each of the plurality of client devices 104 comprises a mobile communication device capable of wired and/or wireless communication with the network 102. Each of the client devices 104 comprises a computer or computing device including, but not limited to, a cellular or mobile phone, smart phone, tablet, portable digital assistant (PDA), Internet appliance, hand-held device, wireless device, portable device, laptop, netbook, ultrabook, wearable computers, multi-processor systems, microprocessor-based or programmable consumer electronics, mini-computers, desktop, personal computer, workstation, and the like. In some embodiments, each of the client devices 104 includes, but is not limited to, an input sensor (e.g., camera, bar code reader, machine readable information reader, physical keyboard, virtual keyboard provided using software on a touch screen), transceiver, storage unit, display (e.g., touch screen), one or more input mechanisms (e.g., keyboard, trackball, trackpad, touch screen), and a processor. The processor is in communication with and configured to coordinate control of each of the input sensor, transceiver, storage unit, display, and input mechanisms. Client devices 104 can be geographically distributed from each other and/or the network 102. Although two client devices 104 are shown in FIG. 1, more or less than two client devices can be included in the system 100.

Each of the client devices 104 further includes one or more applications (also referred to as "apps") such as, but not limited to, a web browser, messaging application, electronic mail (email) application, content creation, layout, and presentation application, one or more apps acquired from an application store or library, and interface and communication capabilities to communicate with one or more components within the system 100. In some embodiments, if a certain application (e.g., content creation, layout, and presentation application) is included in a given client device 104, then this application is configured to locally provide the user interface and at least some of its functionalities with the application configured to communicate with the network 102, on an as needed basis, for data and/or processing capabilities not locally available (such as backgrounds or 3D computations). Alternatively, the content creation, layout, and presentation application may be included in the client device 104, and such application includes all of the features needed to provide 3D presentation without communication with the server 106, database 108, and/or database server 110. Conversely if the application is not included in a client device 104, the client device 104 may use its web browser to access a content creation, layout, and presentation service or site (or a variant thereof) hosted on the server 106. In still other embodiments, depending on the processing and/or storage capacity of the client device 104, at least certain functionalities/operations described herein may be provided by the server 106, database 108, and/or database server 110 on behalf of the client device 104, and other of the functionalities/operations described herein being provided locally at the client device 104.

Server 106 comprises one or more computers or processors configured to communicate with the client devices 104, databases 108, and/or database servers 110 via the network 102. The server 106 is configured to host one or more applications accessed by the client devices 104; to host one or more websites accessed by the client devices 104; to provide processing functionalities for the client devices 104; to provide data, backgrounds, web pages, etc. to the client devices 104; to track and monitor activities associated with the client devices 104; and/or facilitate access to and store information in the databases 108. In some embodiments, the server 106 includes one or more web servers, one or more application servers, one or more servers providing user interface (UI) or graphical user interface (GUI) functionalities in connection with implementation of 3D presentation, one or more servers to apply 3D effect to user content, one or more servers to provide backgrounds to users, one or more servers including 3D computation mechanism, and the like.

Database 108 comprises one or more storage devices configured to store data and/or instructions for use by client devices 104, server 106, and/or database server 110. The content of database 108 is accessed via the network 102, directly by the server 106, and/or database server 110. The content of database 108 includes, but is not limited to, a plurality of backgrounds, associated background information, and the like.

Database server 110 comprises one or more computers or processors configured to facilitate access to the content of database 108. Although not shown, database server 110 may be directly connected to the database 108. Database 108 and database server 110 may be located at one or more geographically distributed locations from each other and also from the server 106. Alternatively, database 108 and/or database server 110 may be included within server 106. As another alternative, database server 110 may be optional when its functionalities/operations are performed by server 106.

Further, while the system 100 shown in FIG. 1 employs a client-server architecture, embodiments of the present disclosure is not limited to such an architecture, and may equally well find application in, for example, a distributed or peer-to-peer architecture system.

Figure 2A:
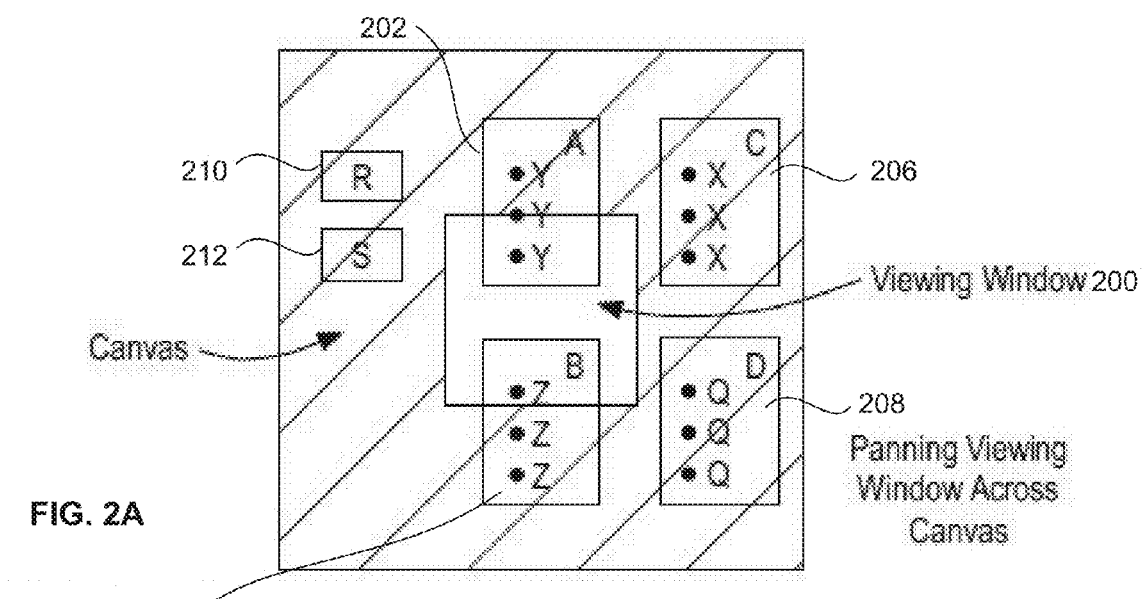
FIGS. 2A-2C illustrate example display elements viewed through a viewing window disposed on a canvas at three different zoom levels according to some embodiments.
Figure 2B:
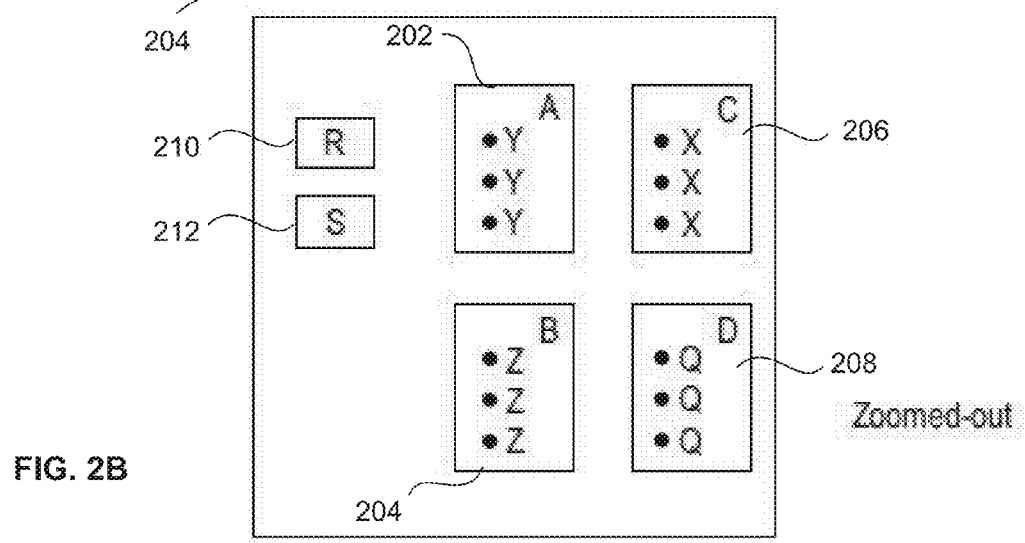
Figure 2C:
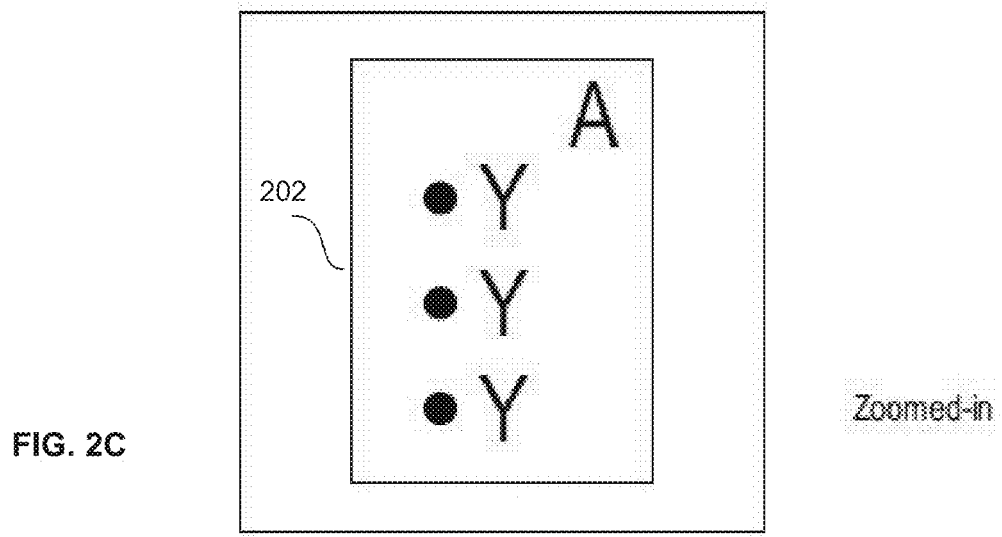

FIGS. 2A-2C illustrate example presentation of display elements included in a ZUI environment. A ZUI is a type of graphical user interface (GUI) in which the scale of a viewed area is changed in order to view more detail or less, and to browse through and among different visual display elements such as text, images, shapes, graphics, documents, videos, or visual content. Display elements may be added to a (visual) workspace referred to as a canvas to create a zoomable presentation in which details and subtopics can be presented through zooming in and out to reveal more or less detail. The canvas is larger than a viewing window generated on a device display screen, and a user can pan a viewing window to view different display elements. The ZUI differs from a normal canvas in that the user may zoom in or out onto a particular display element. Display elements can be inserted anywhere among the presentation content, in addition to grouping display elements within frames. Users can pan across the canvas in two dimensions and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page, and finally as a magnified view of a portion of the page focused on a key passage from the text. Thus, ZUIs use zooming as the primary metaphor for browsing through multivariate or hyperlinked information. Display elements present inside a zoomed region can, in turn, be zoomed themselves to reveal additional detail, allowing for recursive nesting and an arbitrary level of zoom.

FIGS. 2A-2C show example display elements viewed through a viewing window disposed on a canvas at three different zoom levels and three different locations of the canvas. Display elements comprise content such as, but not limited to, text, images, video, graphics, visual information, and the like. A canvas comprises content creation space such as, but not limited to, a document, file, page, screen, presentation, virtual whiteboard, and the like. FIG. 2A shows a canvas including display elements 202, 204, 206, 208, 210, 212, and a viewing window 200 located at a certain location relative to the canvas (e.g., center of the canvas). Because of the particular zoom level, through the viewing window 200 (also referred to as a camera, similar to the viewfinder of a camera) portions of display elements 202 and 204 are visible but in which display elements 206, 208, 210, 212 are not visible.

When the location or position of the viewing window 200 is held constant (e.g., no panning) but the user zooms out relative to the zoom level of FIG. 2A, FIG. 2B shows all of display elements 202-212 visible through the viewing window 200. Conversely, the viewing window 200 can be panned across the canvas (or a portion of the canvas) in any direction. For example, if the user pans toward the top of the canvas (toward display element 202) and retains a similar/same zoom level as in FIG. 2A, FIG. 2C shows a zoomed in view of display element 202 on the same canvas through the viewing window 200.

Figure 3:
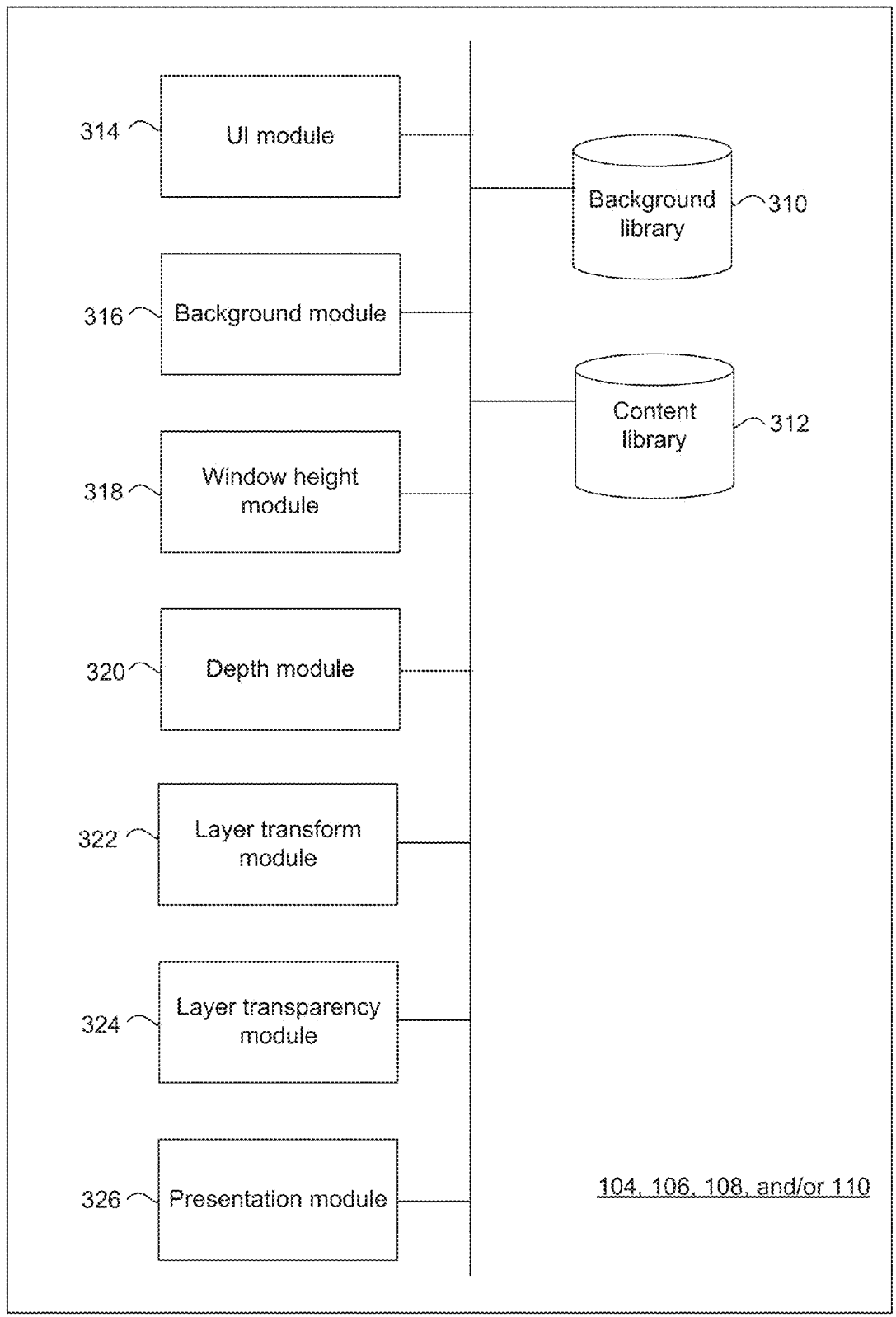
FIG. 3 illustrate a block diagram of additional details of the example system of FIG. 1 implemented in modules according to some embodiments.

FIG. 3 illustrates a block diagram showing example modules and libraries/data structures/databases included in the server 106, database 108, database server 110, and/or client devices 104 to implement the operations and functionalities of FIGS. 4A-4D according to some embodiments. The modules of FIG. 3 comprise one or more software components, programs, applications, apps, or other units of code base or instructions configured to be executed by one or more processors. The modules include a user interface (UI) module 314, a background module 316, a window height module 318, a depth module 320, a layer transform module 322, a layer transparency module 324, a presentation module 326, and a thumbnail module 328. The modules 314-328 can communicate with each other and with each of a background library 310 and a content library 312. Libraries 310 and 312 may be included in the database 108 or client device 104. Although modules 314-328 are shown as distinct modules in FIG. 3, it should be understood that modules 314-328 may be implemented as fewer or more modules than illustrated. It should also be understood that any of modules 314-328 may communicate with one or more components included in the system 100, such as server 106, database 108, database server 110, or client device 104. Similarly, libraries 310 and 312 are shown as distinct libraries in FIG. 3. However, it is understood that the content of libraries 310, 312 may be stored in fewer or more libraries than illustrated.

Figure 5A:
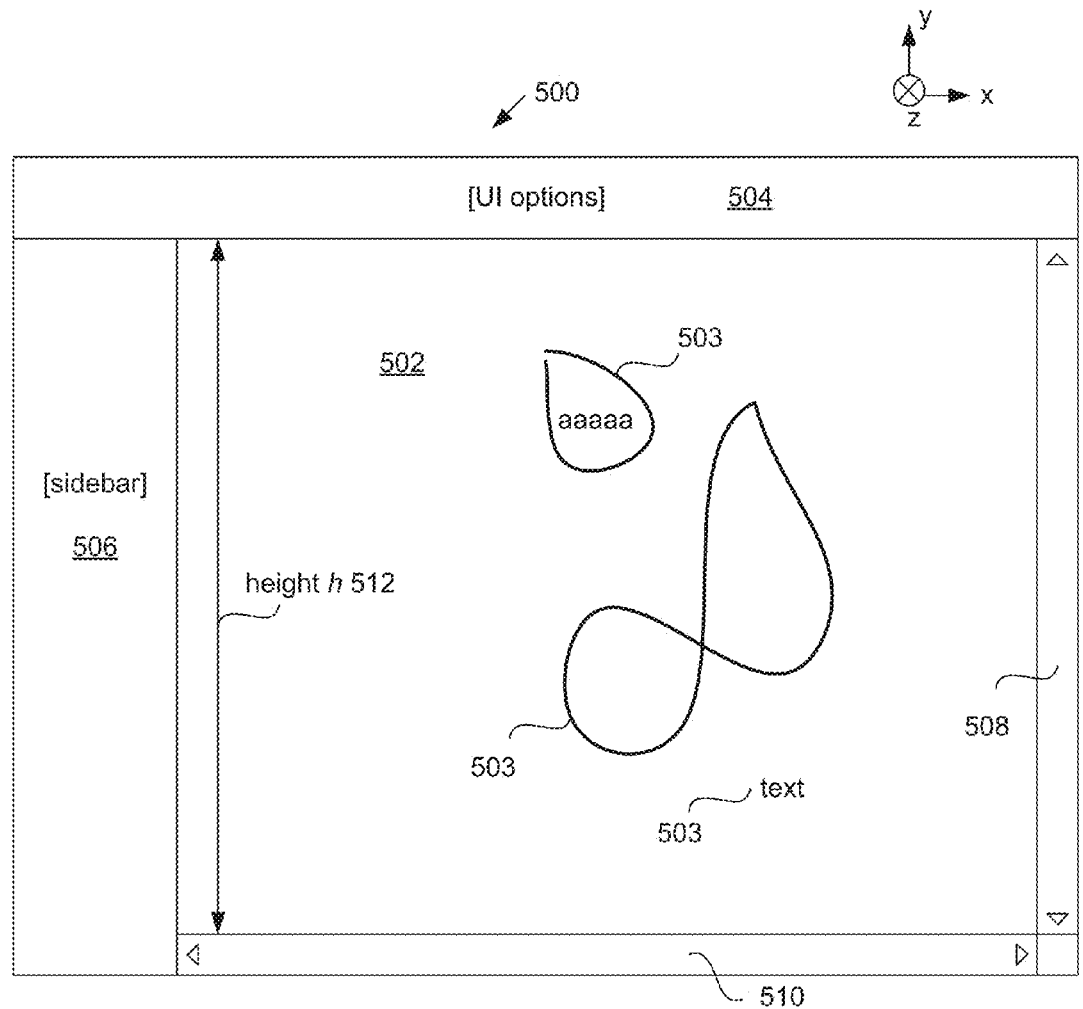
FIG. 5A illustrates components of an example ZUI environment according to some embodiments.
Figure 5B:
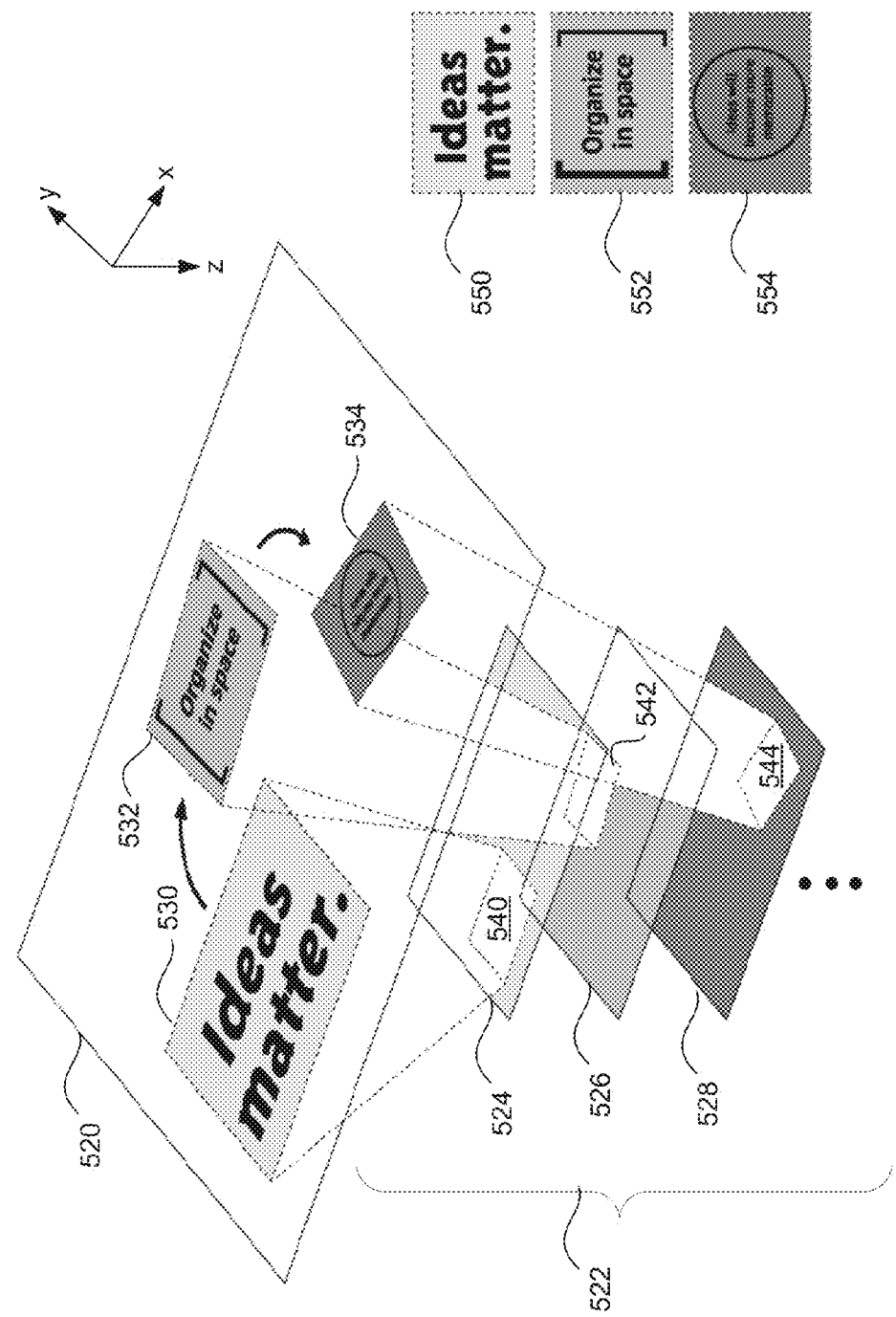
FIG. 5B provides an illustration of image layers located at respective planes upon which parallax effect and gradual fading are applied to generate the 3D effect according to some embodiments.
Figure 6A:
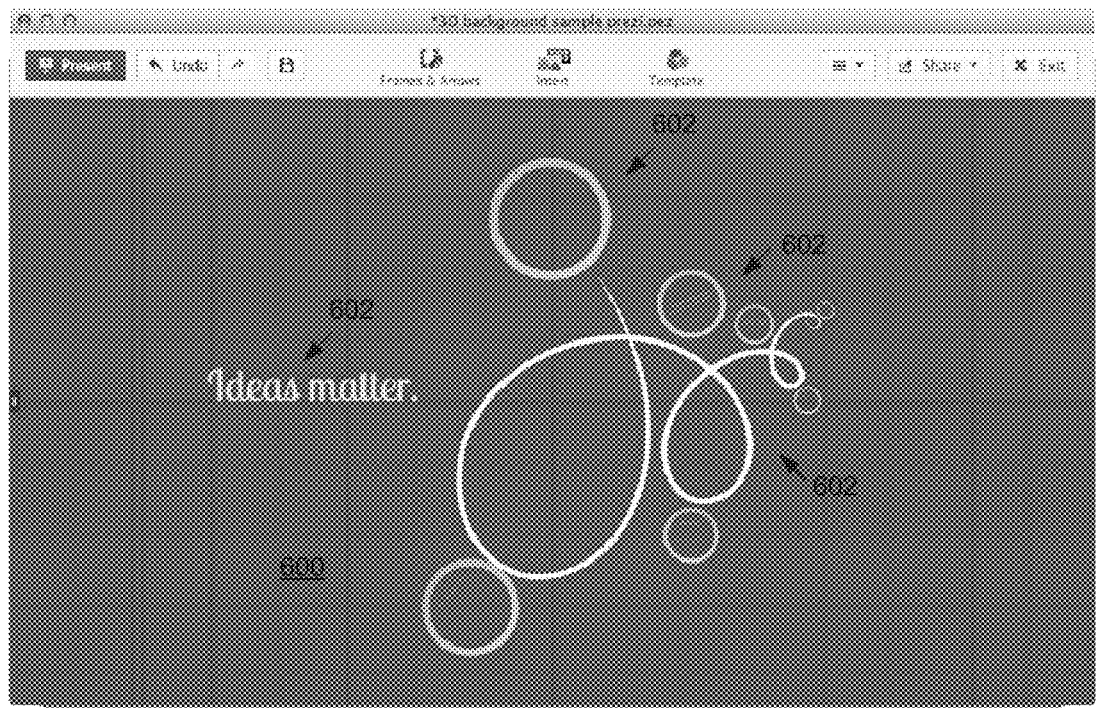
FIGS. 6A-6Q show example screenshots illustrating 3D presentation of content in a ZUI environment according to some embodiments.

FIGS. 4A-4D illustrate example flow diagrams for implementing 3D effect in a ZUI environment according to some embodiments. FIG. 5A illustrates components of an example ZUI environment according to some embodiments. FIG. 5B provides an illustration of image layers located at respective planes with which parallax effect and gradual fading are implemented to generate the 3D effect according to some embodiments. FIGS. 6A-6Q show example screenshots illustrating 3D presentation of content in a ZUI environment according to some embodiments. FIGS. 3, 4A-4D, 5A-5B, and 6A-6Q are discussed below in conjunction with each other.

At a block 402 of flow diagram 400 (FIG. 4A), an index i for the background layers is set to i=0 to await user request or indication to add one or more backgrounds to his/her canvas. Next at a block 404, the UI module 314 receives user selection of an ith background. In one embodiment, a plurality of backgrounds (also referred to as background images) are stored (and updated and maintained) in the background library 310. Background choices are presented to the user (e.g., via background module 316) in response to user request to add or select a background. The user selects a background from among the background choices. In another embodiment, the user uploads or otherwise specifies a storage location of the desired background.

One or more backgrounds can be added or associated with a canvas. In one embodiment, one, two, or three backgrounds can be added or associated with a canvas. Alternatively, more than three backgrounds may be added or associated with a canvas. If the user indicates an interest in selecting/specifying another background (no branch of block 406), then index i is incremented by 1 (block 408) and the UI module 314 receives selection of the next ith background (returns to block 404). Otherwise the background selection is complete (yes branch of block 406), and the flow diagram proceeds to block 410.

FIG. 5A illustrates a screen 500 included in the client device 104, the screen 500 displaying components of a ZUI environment comprising, but not limited to, a main area 502, a UI options area 504 (e.g., menu, toolbar, tabs, etc.), a sidebar area 506, vertical scroll control area 508, and/or horizontal scroll control area 510. The main area 502 comprises the area in which the user creates, edits, and views display elements 503 included in the canvas. The main area 502 corresponds to the viewing window of the canvas, such as the viewing window 200 discussed above in connection with FIGS. 2A-2C. The viewing window is also referred to as the view port, camera, or camera viewfinder.

A height h 512 of the main area 502 is expressed as a certain number of pixels. The number of pixels depends on the physical dimensions of the screen 500, aspect ratio of the screen 500 (e.g., 16:9, 4:3, etc.), the resolution of the screen 500, and the size of the ZUI environment window relative to the screen 500. FIG. 5A shows the ZUI environment window maximized on the screen 500. However, if the ZUI environment window is resized (e.g., made smaller), then the main area 502 along with the other areas of the ZUI environment window are correspondingly resized (e.g., made smaller). This has the effect of changing the height h 512 (e.g., to a smaller number of pixels). In one embodiment, height h 512 (also referred to as the height or window height) reflects the current "size" of the main area/viewing window/view port/camera/camera viewfinder at the client device 104. If, for example, the user resizes the ZUI environment only in the horizontal direction (along the x-axis) but makes no change in the vertical direction (along the y-axis), height h 512 remains unchanged and the main area 502 is deemed not to have changed in "size," even though, in fact, the width of the main area 502 has changed.

FIG. 5B illustrates an example representation of the backgrounds specified by the user in block 404 relative to the canvas along the third dimension (z-axis) that the 3D effect visually provides in a 2D screen. The canvas is represented as a canvas layer 520, the canvas layer 520 located in a canvas (imaging) plane. Each of the backgrounds selected by the user is represented as a separate background layer, each of the background layers located in a respective background (imaging) plane. The set of backgrounds selected by the user comprises the background layers 522. In one embodiment, the background layer selected by the user to be the closest to the viewing window (e.g., main area 502)—and thus also the closest to the canvas layer 520—is denoted as the i=0 background layer 524 (also referred to as the top background layer 524). The next background layer closest to the viewing window is denoted as the i=1 background layer 526 (also referred to as the middle background layer 526, when the user has selected a total of three background layers). The next background layer after the i=1 background layer is denoted the i=2 background layer 528 (also referred to as the bottom background layer 528, when the user has selected a total of three background layers). The remaining background layers are similarly respectively indexed, with the background layer furthest from the viewing window/canvas layer 520 being the i=n background layer. Thus, the user selects n+1 number of backgrounds and such background layers are indexed from i=0 to n, respectively, from closest to furthest from the canvas layer 520.

The canvas layer 520 and the background layers 522 (collectively referred to as a plurality, set, or stack of image layers or planes) are separated from each other by a certain distance or depth along the z-axis. The distance or depth between the canvas layer 520 and 0th background layer 524 is denoted the 0th depth. The distance or depth between the canvas layer 520 and 1st background layer 526 is denoted the 1st depth. The distance or depth between the canvas layer 520 and 2nd background layer 528 is denoted the 2nd depth, and so on. The 0th depth is smaller than the 1st depth, the 1st depth is smaller than the 2nd depth, and so on.

The 3D rendering scheme or mechanism of the present disclosure facilitates simultaneous display of canvas and backgrounds with parallax effect to achieve the perception of visual perspective or depth in the displayed content, e.g., 3D effect. Even though two objects (e.g., first object and second object) are the same absolute size and/or move at the same rate, the second object in the distance appears to be smaller than the first object in the foreground. The second object in the distance also appears to move slower than the first object in the foreground. When the size of the first object changes, such as due to zooming in or out of the first object, the second object located in the distance appears to change in size at a rate that is proportionally smaller than the size change of the first object. Similarly, when the first object moves, such as due to panning left/right/up/down on or near the first object, the second object in the distance appears to move that at a rate that is proportional smaller than the rate of the first object.

In embodiments of the present 3D rendering scheme, when the canvas layer 520 and background layers 522 are rendered with parallax, a given background layer tends to dominate over the other background layers within the set or stack to render the given display element included in the canvas layer 520 (the given display element occupying the majority of the viewing window area). Which background layer(s) are relevant for display with a given display element depends upon the size or scale of the given display element relative to the other display elements in the same canvas. The smaller the size or scale of a display element in the canvas relative to the other display elements in the canvas, more the background layer(s) located toward the bottom of the stack (the deeper-located background layer(s)) dominates for the display element. Conversely, the larger the size or scale of a display element in the canvas relative to the other display elements in the canvas, more the background layer(s) located toward the top of the stack dominates for the display element. This is not to say that only a single background layer dominates or is relevant for a display element. As described in detail below, the implementation is more nuanced in that the transition from one background layer to another happens gradually, and thus, more than one background layer may be relevant or a certain mix of more than one background layers may be relevant for a given display element.

In FIG. 5B, the canvas layer 520 is shown including display elements 530, 532, and 534. The size or scale of the display elements included in the canvas layer 520 relative to each other is as follows: display element 530 is the largest, display element 532 is medium sized, and display element 534 is the smallest. Because the display element 530 is the largest among the display elements in canvas layer 520, the "dominant" background layer(s) comprises the topmost background layer 524. The "dominant" background layer for the medium-sized display element 532 comprises the middle background layer 526. The "dominant" background layer for the smallest display element 534 comprises the bottom background layer 528. As an example, when the zoom level is appropriate for the display element 530 to occupy most or all of the viewing window area, the background content contribution from the background layers 522 may be as follows: 100% from topmost background layer 524, 0% from middle background layer 526, and 0% from bottom background layer 528. As another example, when the zoom level is appropriate for the display element 534 to occupy most or all of the viewing window area, the background content contribution from the background layers 522 may be as follows: 0% from topmost background layer 524, 20% from middle background layer 526, and 80% from bottom background layer 528. The gradual transitioning between background layers or the mixture of relevant background layers is achieved with different opacity levels for respective background layers.

In addition to matching up certain background layer(s) as the "dominant" background layer(s) to a given display element of the canvas layer 520 in accordance with the size of the display element relative to the size of all the other display elements, determining which image portion/area/region of the "dominant" background layer(s) (also referred to as the background crop) to display with the given display element is based on the given display element's relative position in the current bounding box of the canvas (active canvas area). As shown in FIG. 5B, the display element 530 is positioned in the bottom left region of the overall active canvas area. A background crop 540 correspondingly comes from the bottom left region of the "dominant" top background layer 524. The display element 532 positioned in the top middle region of the overall active canvas area, means that a background crop 532 in the "dominant" middle background layer 526 is taken from the top middle region of the middle background layer 526. The region of the bottom background layer 528 for a background crop 544 for the display element 534 is similarly determined. Also note that the size of background crop 540 is larger than background crop 542, and background crop 542 is larger than background crop 544, corresponding to the size differential among its respective display elements 530, 532, 534.

Once a given background crop is rendered with its display element, to maintain the parallax effect, the amount of horizontal (x-axis direction) or vertical (y-axis direction) motion is relaxed for the background layer(s) compared to the amount of such motion on the canvas layer. For example, if a user pans or moves along the canvas 100 units to the right, the background crop of the "dominant" background layer(s) is taken from 10 units to the right of the previous background crop location on the "dominant" background layer(s) instead of 100 units to the right as in the canvas.

Implementation details of embodiments of the 3D rendering scheme are further described and quantified in the equations and operations discussed below.

Renderings 550, 552, and 554 shown in FIG. 5B comprise content displayed in the viewing window (e.g., main area 502 of FIG. 5A) when the zoom level and pan position are set to display all of each of display elements 530, 532, 534, respectively, within the respective viewing window. Rendering 550 shows display element 530 displayed with background crop 540. Rendering 552 shows display element 532 displayed with background crop 542. Rendering 554 shows display element 534 displayed with background crop 544. Alternatively, renderings 550, 552, 554 can comprise thumbnails or snapshots of certain area or content of the presentation at certain zoom level that are generated by the user. Such thumbnails or snapshots may be displayed together in the sidebar area 506 of FIG. 5A.

Returning to FIG. 4A, once the user has specified all of the backgrounds, the window height module 318 calculates a window height ratio value at a block 410.

$$heightRatio(h) = \frac{768}{h} \qquad (1)$$

where h is the height of the current viewing window in number of pixels (e.g., height h 512 shown in FIG. 5A).

Next at a block 412, the depth module 320 calculates an ith depth value for i=0 to n according to the following function:

$$depth(i, ms) = \frac{(i+1)}{ms} \qquad (2)$$

where ms=minimum viewing window scale, which is the viewing window scale at which all display elements included in the canvas layer are simultaneously visible within the viewing window area. Equation (2) expresses the distance or depth separation between the background layers as shown in FIG. 5B. The ms value can be a value between zero to infinity, and correspondingly the depth(i,ms) value is also between zero to infinity. The larger the area of the canvas layer in which the display elements are distributed, the closer the ms value is to zero. As an example, ms may be 4000 for a typical canvas. The exact increment or value range of the viewing window scale is one of design choice. Based on equation (2), it can be seen that depth for the 0th background layer is smaller than the depth for the 1st background layer, and the depth for 1st background layer is smaller than the depth for the 2nd background layer, etc. Whatever the particular depth value of a given background layer, the depth or distance between the background layers is constant relative to each other.

In one embodiment, the ms value, and correspondingly the depth values, is constant based on the existing display elements included in the canvas layer at the time of 3D initiation for a given set of selected backgrounds. If, for example, the user adds or edits display elements in the canvas layer to a new area outside of the area that would be visible at the ms value after the initial 3D rendering is completed, no new ms value is used to recalculate depth values. In another embodiment, additions or edits to display elements outside of the previous area of the canvas layer triggers recalculation of the depth values based on the updated ms value.

At a block 414, the background module 316 determines initial 3D parameters or settings. Although a canvas can theoretically be infinite in canvas size, the canvas area of interest may be limited to the area in which all of the display elements are distributed, such canvas area referred to as the active canvas area, useable canvas area, relevant canvas area, or canvas area of interest. The image content included in each of the backgrounds is positioned centered relative to the active canvas area. Thus, while the depth values calculated in block 410 define the position of each of the ith background layers along the z-axis, the "centering" defines the positioning of each of the ith background layers relative to the canvas layer along the x- and y-axes (see FIG. 5B). And similar to the constancy of the depth values, the "centering" is also maintained through subsequent panning or zooming actions. In other words, a given (x, y) position of a given background layer is fixed to a given (x, y) position of the canvas layer independent of the zoom level or panned location of the canvas.

If there is more than one background layer associated with the canvas layer, the topmost background layer (the background layer closest to the canvas layer) is set to be 100% opaque.

The background module 316 facilitates saving initial 3D values for later use at a block 416. The initial 3D values can be stored in the database 108, in client device 104, or background library 310. Initial 3D values comprise, without limitation, the window height ratio (from block 410), the ith depth values for i=0 to n (from block 412), and/or the initial 3D parameters (from block 414).

Using at least the initial 3D parameters from block 414, the presentation module 326 facilitates display of all the selected backgrounds in proper perspective to the canvas (block 418). In some embodiments, the presentation module 326 may default to the minimum viewing scale (e.g., zoom all the way out so that all of the display elements are shown at the same time) for initial 3D rendering of the canvas with the backgrounds. Initially, even if more than one background is specified by the user, only the topmost background from among all of the selected backgrounds may be visible because the topmost background layer is set to be 100% opaque.

Figure 4A:
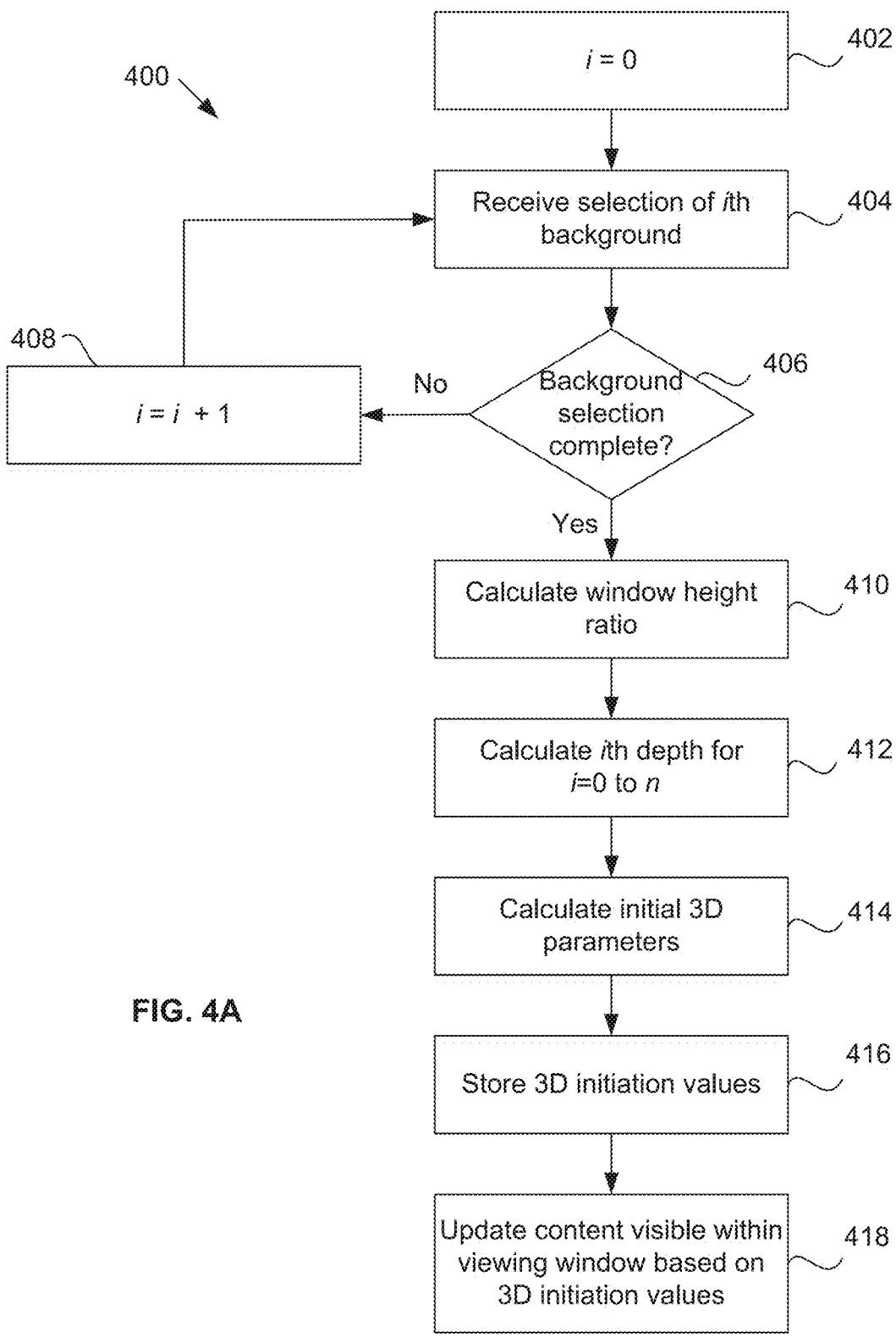
Figure 4B:
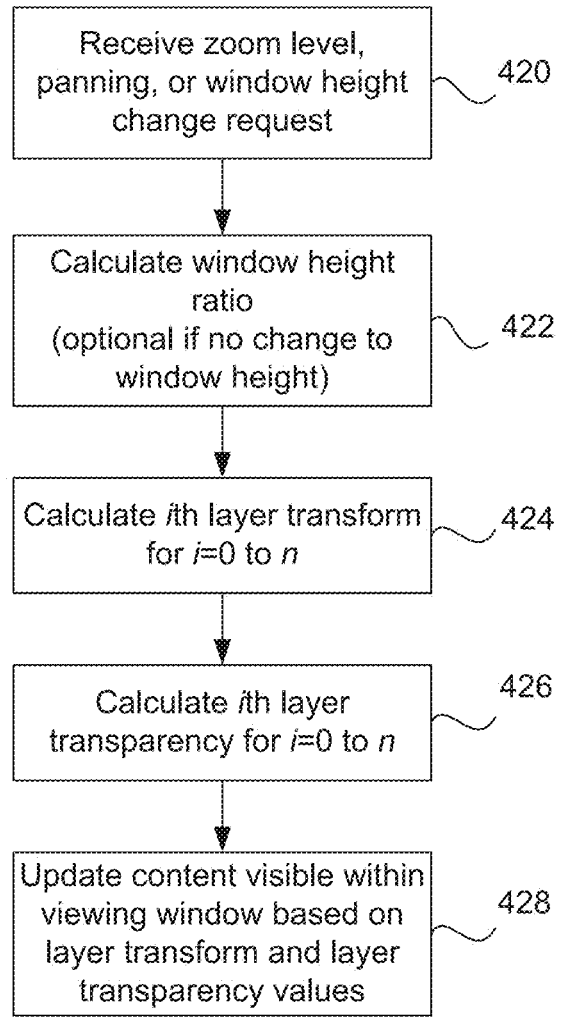

Although not shown, it is contemplated that blocks 410, 412, and/or 414 may be performed simultaneously with each other or in a different order relative to each other from that shown in FIG. 4A. It is also contemplated that certain computations, such as blocks 410 and/or 412, may be performed after block 418.

When the user navigates within the 2D space ZUI environment after the initial 3D rendering at block 418, embodiments of the 3D rendering scheme is configured to be responsive to user actions and provide 3D updates in real-time or near real-time. In some embodiments, the UI module 314 receives a zoom level, panning, and/or window height change request (or action or initiation) from the user, as shown in a block 420 of FIG. 4B. Any of these change requests comprises a trigger to update the 3D rendering.

In response to a trigger in block 420, the window height module 318 calculates a window height ratio using the height h value at a block 422. The window height ratio is determined using equation (1) and similar to the discussion above in connection with block 410. Block 422 may be optional if there is no change to the height h, such as when the user action comprises zooming in/out or panning. The previously calculated weight height ratio is still current under this scenario.

Next at a block 424, the layer transform module 322 calculates the ith layer transform for i=0 to n. A layer transform is calculated for each of the background layers. The layer transform specifies the appropriate scale of the respective background layer in accordance with the current zoom level. The layer transform also specifies the respective background layer's position in the 2D coordinate space associated with the viewing window in accordance with the current panning position. In other words, the particular portion of the respective background layer to be visible in the viewing window is identified. Block 424 determines a new background crop for each of the background layers. Additional details for calculating the layer transform are described below in connection with FIG. 4C.

At a block 426, the layer transparency module 324 calculates the ith layer transparency for i=0 to n. A layer transparency value is calculated for each of the background layers. The layer transparency specifies the degree of transparency (or conversely the degree of opaqueness) of the respective background layer in accordance with the current zoom level and the respective background layer's position relative to the other background layers. The layer transparency defines how much and whether a given background layer will be visible within the viewing window. Additional details for calculating the layer transparency are described below in connection with FIG. 4D.

Using the calculated layer transform values and layer transparency values, the presentation module 326 updates the content displayed within the viewing window of the 2D space ZUI environment (block 428). The update is responsive to the zoom level change user action (e.g., zooming in or out of a particular region or display element of the canvas), panning user action (e.g., moving across the canvas), and/or window height change user action received in block 420. Due to the simplification of the 3D computations, the update or 3D re-rendering occurs in real-time or near real-time.

Although block 424 is shown before block 426, it is understood that block 424 may be performed after block 426, or both blocks 424 and 426 may be performed simultaneously as processing capabilities permit.

FIG. 4C illustrates example sub-blocks of block 424 for calculating the layer transforms for all of the background layers associated with the canvas layer according to some embodiments. At a sub-block 430, the index i is set to zero in preparation of performing computations for each of the background layers, starting with the 0th background layer (the background layer closest to the canvas layer). At a sub-block 432, the layer transform module 322 calculates the ith layer scale value using the formula below:

$$layerScale(cs, i, h) = \frac{1}{1 + (cs \cdot depth(i, ms) \cdot heightRatio(h))} \quad (3)$$

where heightRatio(h) and depth(i,ms) are values calculated using equations (1) and (2), respectively, and cs=current viewing window scale. The value of cs is based on the same value scale as the ms value. The cs value is greater than or equal to the ms value. The cs value represents the current zoom level of the viewing window, and reflects any zooming in or out of the canvas by the user detected in block 420. Thus, the ith layer scale value defines the size or scale of the ith background layer that should be visible within the viewing window. Because the ith layer scale is inversely proportional to the ith depth, the 0th layer scale is greater than the 1st layer scale which is greater than the 2nd layer scale and so on.

Next at a sub-block 434, the layer transform module 322 calculates the ith layerX value using the formula below:

$$layerX(cx,cs,i,h) = cx \cdot (1 - layerScale(cs,i,h)) \quad (4)$$

where cx=the horizontal coordinate of the current viewing window. The cx value identifies the position of a reference point of the viewing window (e.g., the center of the viewing window) along the horizontal direction or the x-axis (see FIG. 5A) relative to a reference point of the active canvas area. The position of the viewing window relative to the canvas can be represented by Cartesian coordinates (x, y). The cx value provides the current horizontal pan position of the viewing window relative to the active canvas area. Thus, the ith layerX value provides the horizontal coordinate of the ith background layer sized/scaled according to the ith layer scale relative to the viewing window.

Similarly, at a sub-block 436, the layer transform module 322 calculates the ith layerY value using the formula below:

$$layerY(cy,cs,i,h) = cy \cdot (1 - layerScale(cs,i,h)) \quad (5)$$

where cy=the vertical coordinate of the current viewing window. The cy value completes the identification of the viewing window position relative to the canvas in 2D space, along with the cx value discussed above. The ith layerY value provides the vertical coordinate of the ith background layer sized/scaled according to the ith layer scale relative to the viewing window.

At a sub-block 438, the layer transform module 322 calculates the ith layer transform function as a function of the ith layer scale, layerX, and layerY values as follows.

$$layerTransform(cs, cy, cs, i, h) = \begin{bmatrix} layerScale(cs, i, h) & 0 & layerX(cx, cs, i, h) \\ 0 & layerScale(cs, i, h) & layerY(cy, cs, i, h) \\ 0 & 0 & 1 \end{bmatrix} \quad (6)$$

The ith layer transform function produces a transformation matrix.

At a sub-block 440, the layer transform module 322 determines or calculates the ith background layer's new/updated/ final transform value. The ith layer transform function transformation matrix determined in sub-block 438 is concatenated to the ith background layer's transformation matrix (which defines the initial "centering" position of the ith background layer relative to the canvas layer). The ith background layer transformation matrix comprises one of the initial 3D parameters from block 414 that is stored for subsequent use. The concatenation with the ith background layer's transformation matrix ensures that the ith background layer overall stays centered relative to the canvas layer, as specified during 3D initialization or set up, regardless of subsequent change in zoom level, panning position, and/or window height. The resulting ith background layer's new transform value provides the new position coordinates (x,y) in Cartesian space corresponding to the particular portion of the ith background layer content to be displayed within the updated viewing window. The new ith background layer's new transform value defines the particular location and size of a new background crop for the ith background layer that will fully fit the viewing window and achieve parallax with the new canvas content.

Next at a sub-block 442, a check is performed to see whether i>=n. If i is less than n (no branch of sub-block 442), then the index i is incremented by 1 (sub-block 444) and the flow returns to sub-block 432 to perform calculations for the next (1st) background layer. This loop may be repeated for each increment of i until all of the background layers' new positions are determined. When i>=n (yes branch of sub-block 442), then the flow proceeds to block 426 in FIG. 4B.

Figure 4D:
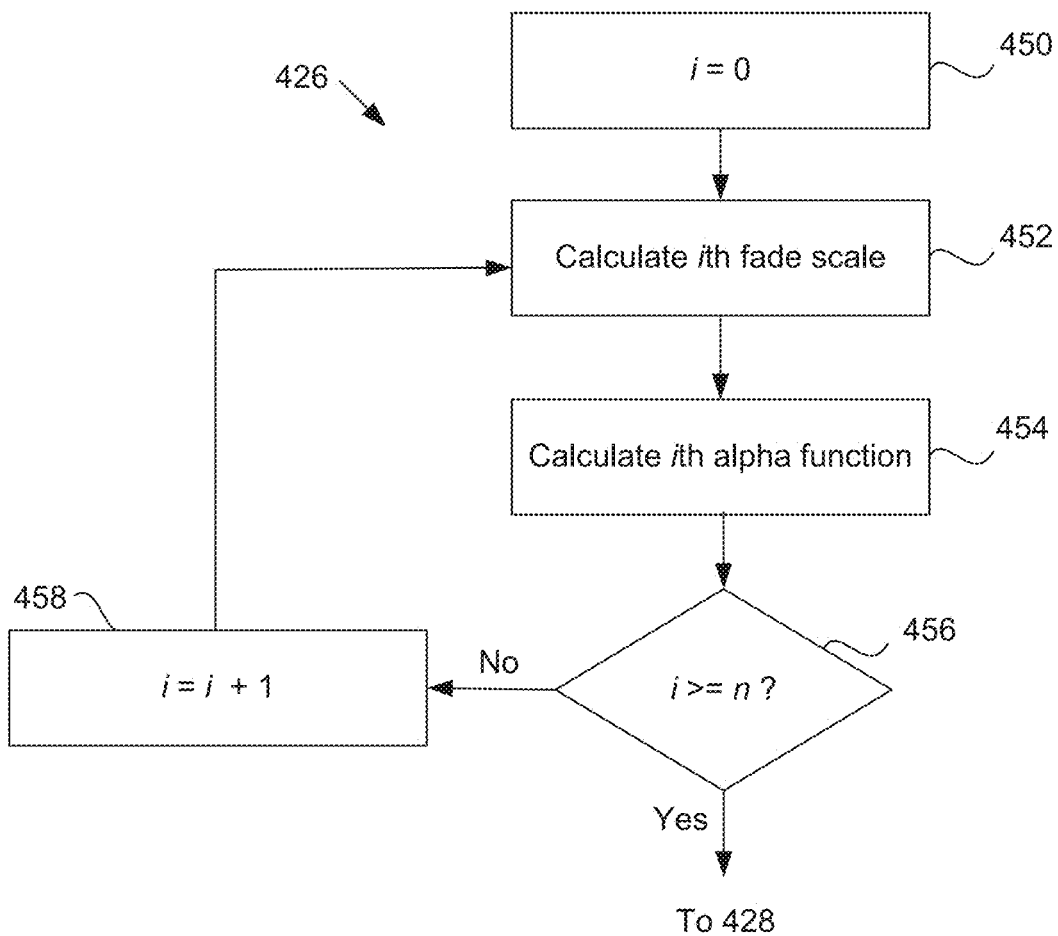

FIG. 4D illustrates example sub-blocks of block 426 for calculating the layer transparency for all of the background layers associated with the canvas layer according to some embodiments. At a sub-block 450, the index i is set to zero in preparation of performing computations for each of the background layers, starting with the 0th background layer (the background layer closest to the canvas layer). At a sub-block 452, the layer transparency module 324 calculates the ith fade scale value using the formula below:

$$fadeScale(i, ms) = \frac{(2.2) \cdot 5^i}{ms} \quad (7)$$

where ms=minimum viewing window scale, which is the viewing window scale at which all display elements included in the canvas layer are simultaneously visible within the viewing window area. Because ms is constant for various values of i, the ith fade scale increases as i increases.

Next at a sub-block 454, the layer transparency module 324 uses the ith fade scale determined in sub-block 452 to calculate the ith alpha function (also referred to as the ith alpha or opacity level).

$$alpha(cs, h, i, ms) = 1 - \min\left[1, \max\left(0, \frac{\log(cs \cdot heightRatio(h)) - \log(fadeScale(i, ms))}{0.7}\right)\right] \quad (8)$$

The ith alpha function has a value between 0 and 1. A value of 0 corresponds to being fully transparent, 1 indicates being fully opaque, and values between 0 and 1 correspond to a proportionate translucence that is in between being transparent or opaque. The ith alpha function defines the extent to which the ith background layer visible within the viewing window should be transparent or opaque. The ith alpha function for each of the respective ith background layers controls the gradual transition or fading of the background layers relative to each other.

As the cs value increases (zooming in), the more likely that background layer(s) further away from the canvas layer will be visible. The nth alpha function is held constant at 1 to ensure that there will always be at least one background layer visible regardless of the extent of zoom in/out. As an example, if the 0th alpha function=1, then the 0th background layer is displayed at 100% opacity and all other background layers below the 0th background layer will not be visible regardless of their opacity level. The canvas layer is always displayed at 100% opacity.

Next at a sub-block 456, a check is performed to see whether i>=n. If i is less than n (no branch of sub-block 456), then the index i is incremented by 1 (sub-block 458) and the flow returns to sub-block 452 to perform calculations for the next (1st) background layer. This loop may be repeated for each increment of i until all of the background layers' new transparency/opacity levels are determined. When i>=n (yes branch of sub-block 456), then the flow proceeds to block 428 in FIG. 4B.

Accordingly, the FIG. 4C computations provide the new scale/size of each of the background layers and the particular position of each of the background layers relative to the canvas layer to be displayed within the current viewing window. The FIG. 4D computations provide the new transparency/opacity level of each of the background layers within the current viewing window. These values together specify the requisite information to update content displayed within the viewing window, including the content of the canvas layer and all of the background layers associated with the canvas layer (block 428 in FIG. 4B).

FIGS. 6A-6Q illustrate example 3D display of the contents of the canvas layer with the background layers chosen by the user according to some embodiments. FIG. 6A illustrates content displayed within an example viewing window 600 of a ZUI environment. The content displayed within the viewing window 600 comprises a plurality of display elements 602 included in a canvas. The use may have created and/or edited the display elements 602. Although not known, the display elements 602 may be stored in the content library 312. At this point, there is no background associated with the canvas.

Figure 6B:
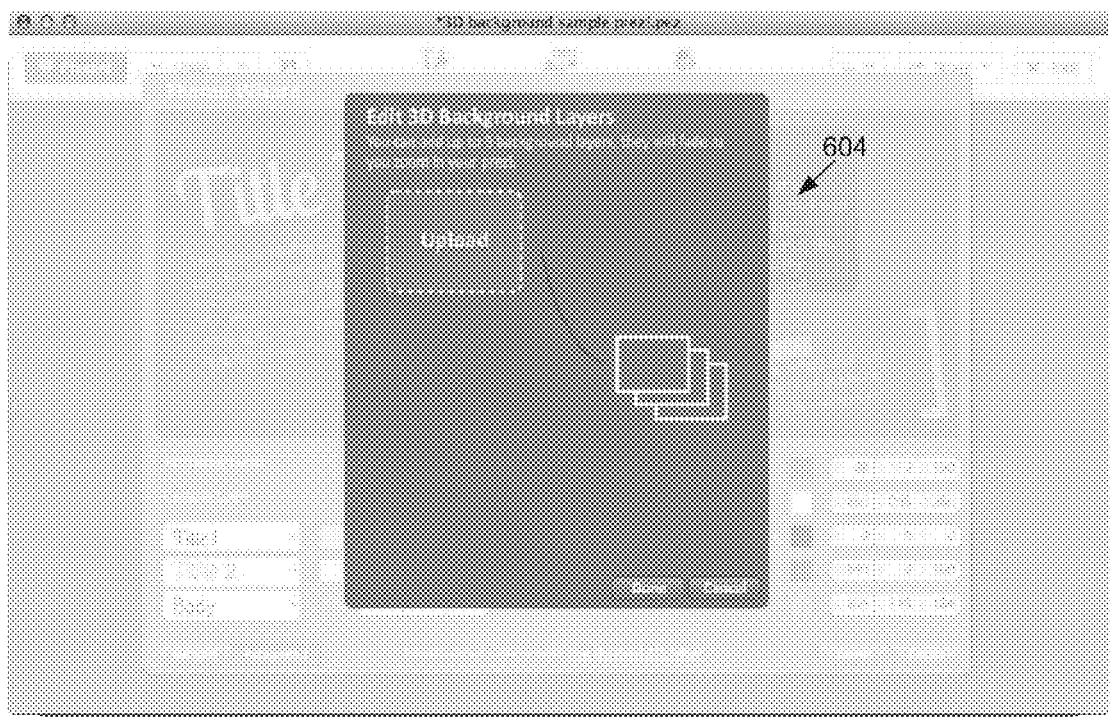
Figure 6C:
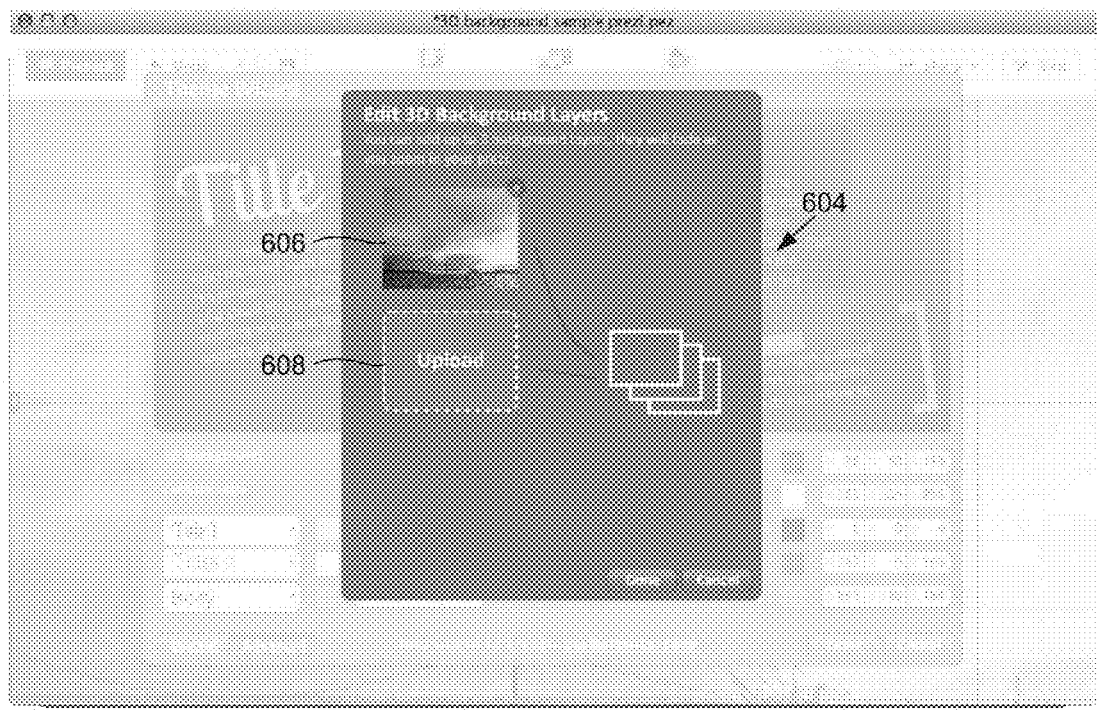
Figure 6D:
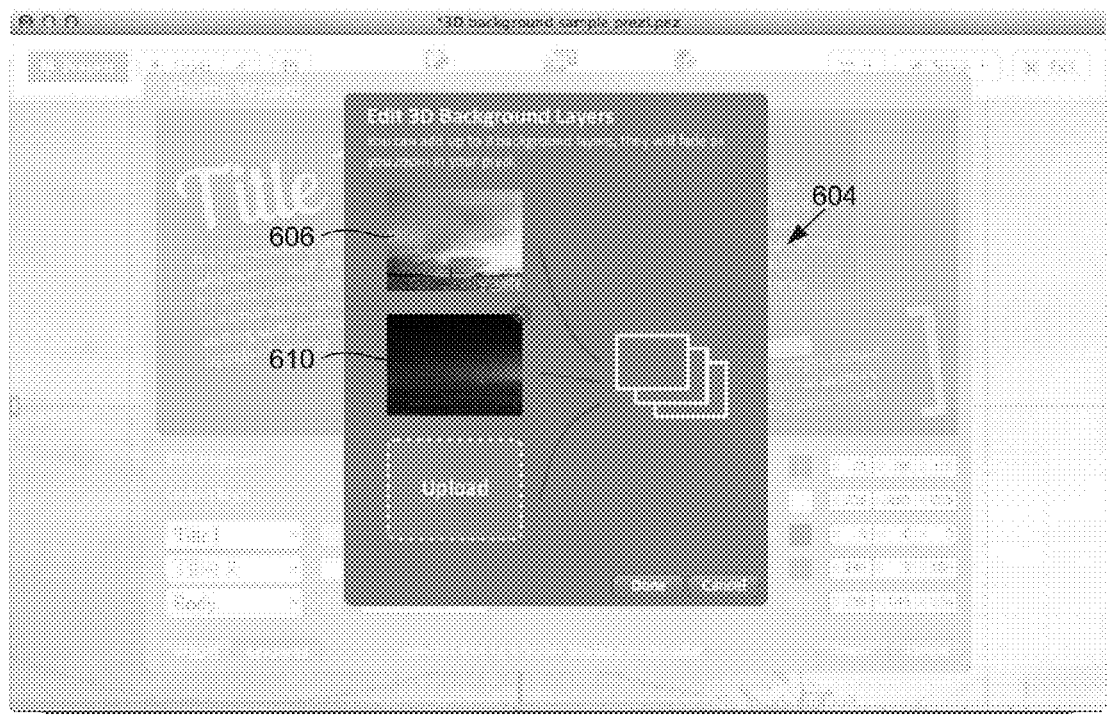
Figure 6E:
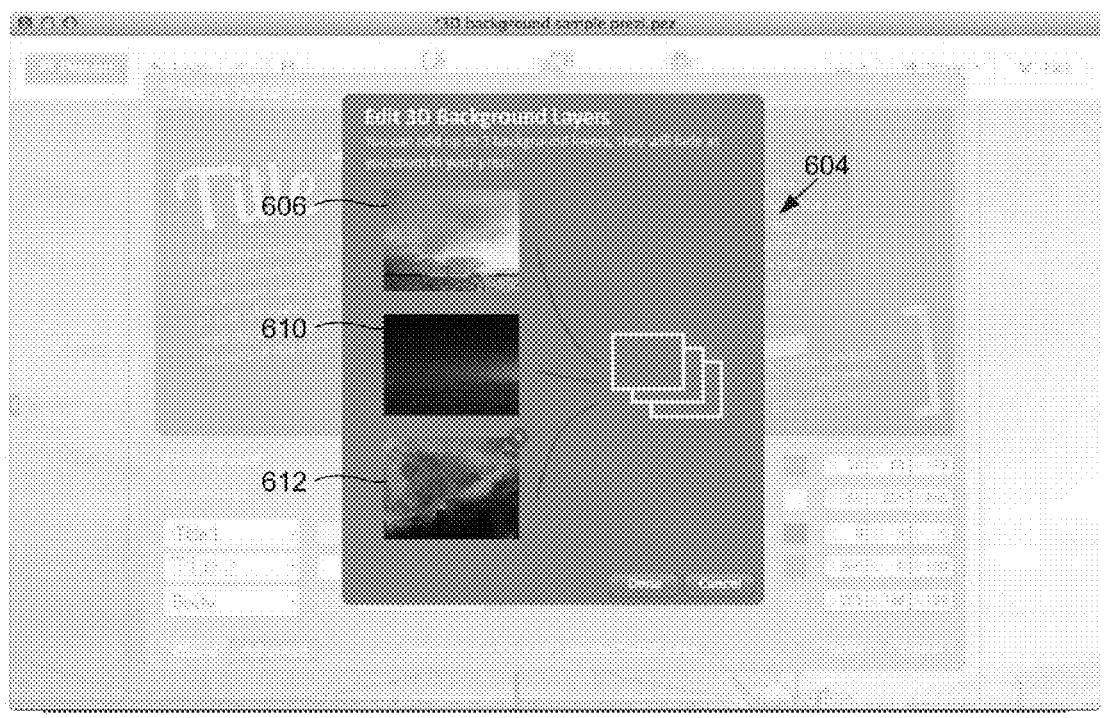

FIG. 6B illustrates presentation of an example UI 604 in response to user initiation/request to associate a background with the canvas. In this example, up to three backgrounds may be designated for display with the canvas content. FIG. 6C illustrates user selection of a background 606 using the UI 604. The background 606 comprises a particular image, for example, a photograph of the sky near sunset with a bridge and rippling water. Because the user chose to locate background 606 at the topmost background designation location (e.g., above background designation location 608), this is construed as a request to treat background 606 as the background closest to the viewing window/canvas layer (e.g., background 606 corresponds to the 0th background layer). FIG. 6D illustrates user selection of a background 610 using the UI 604. The background 610 comprises a particular image (that is different from the image of background 606), for example, a photograph of the night sky including stars. The background 610 comprises the 1st background layer. FIG. 6E illustrates user selection of a background 612 using the UI 604. The background 612 comprises a particular image (that is different from each of the images of backgrounds 606 and 610), for example, a photograph of outer space. The background 612 comprises the 2nd (and final) background layer.

As the user selects/uploads/identifies each of the backgrounds 606, 610, and 612, each of the selection is received at block 404 of FIG. 4A.

Figure 6F:
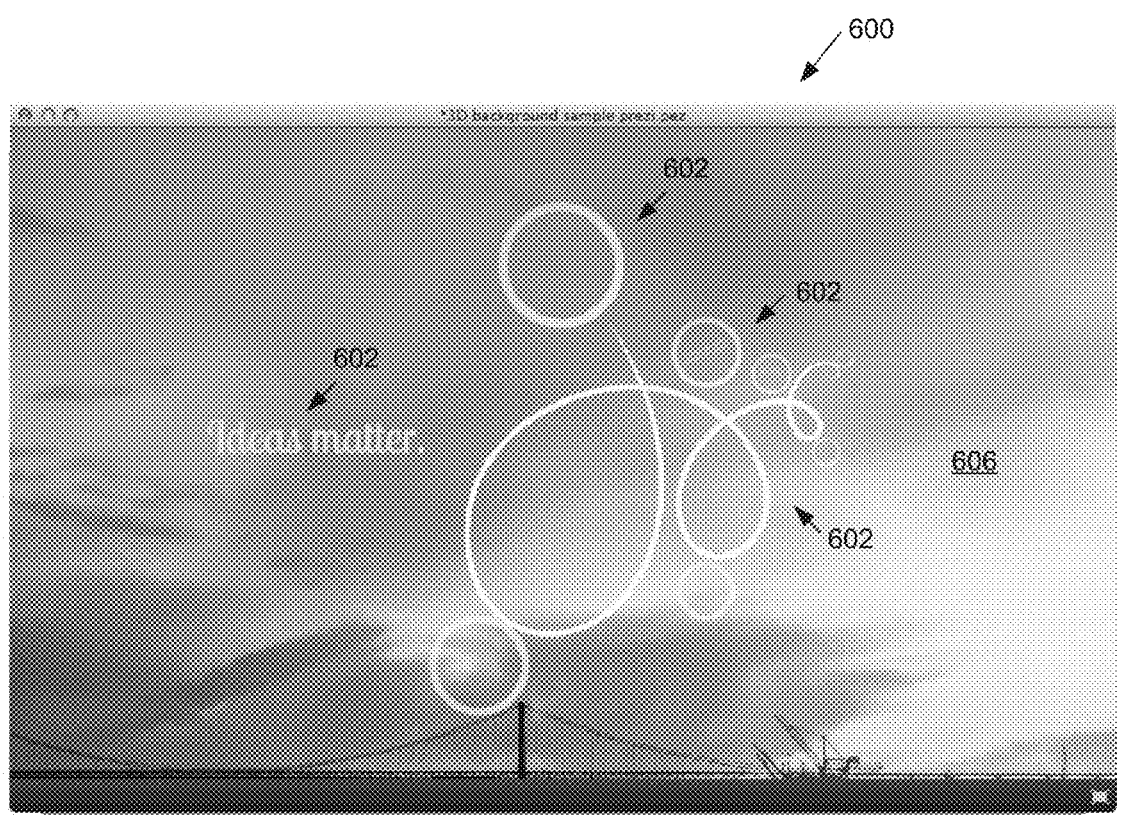
Figure 6G:
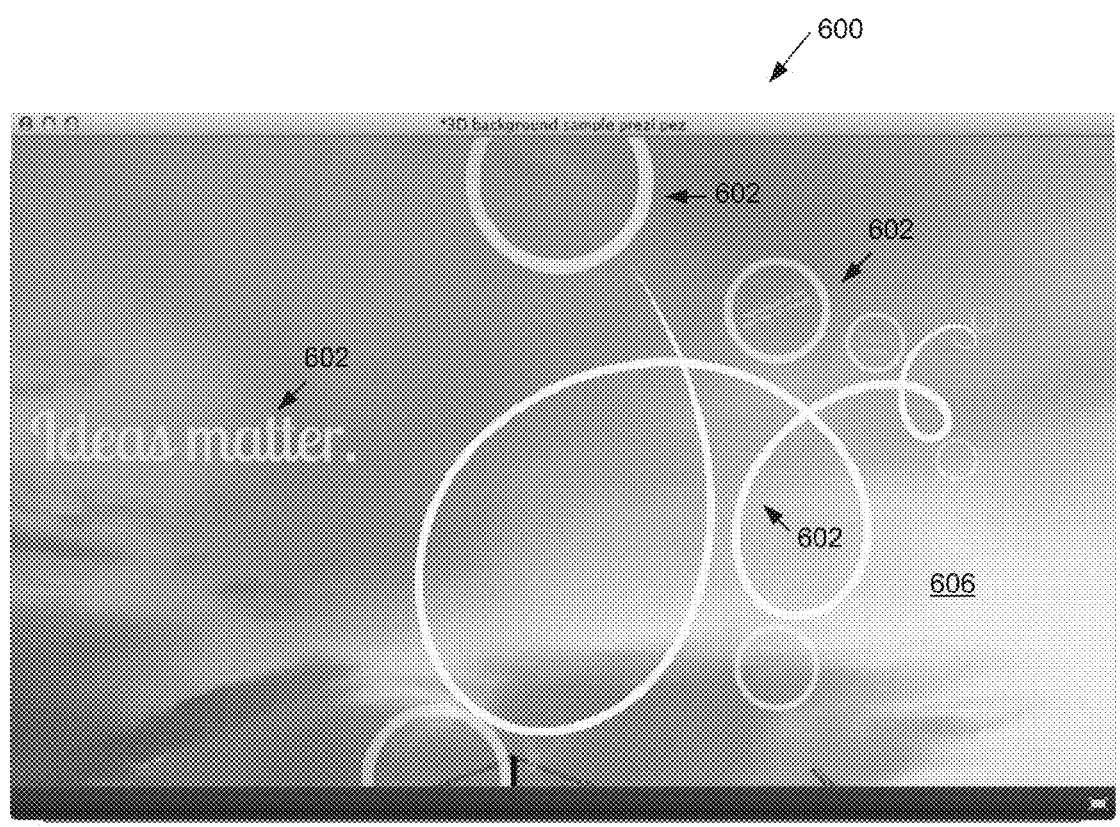
Figure 6H:
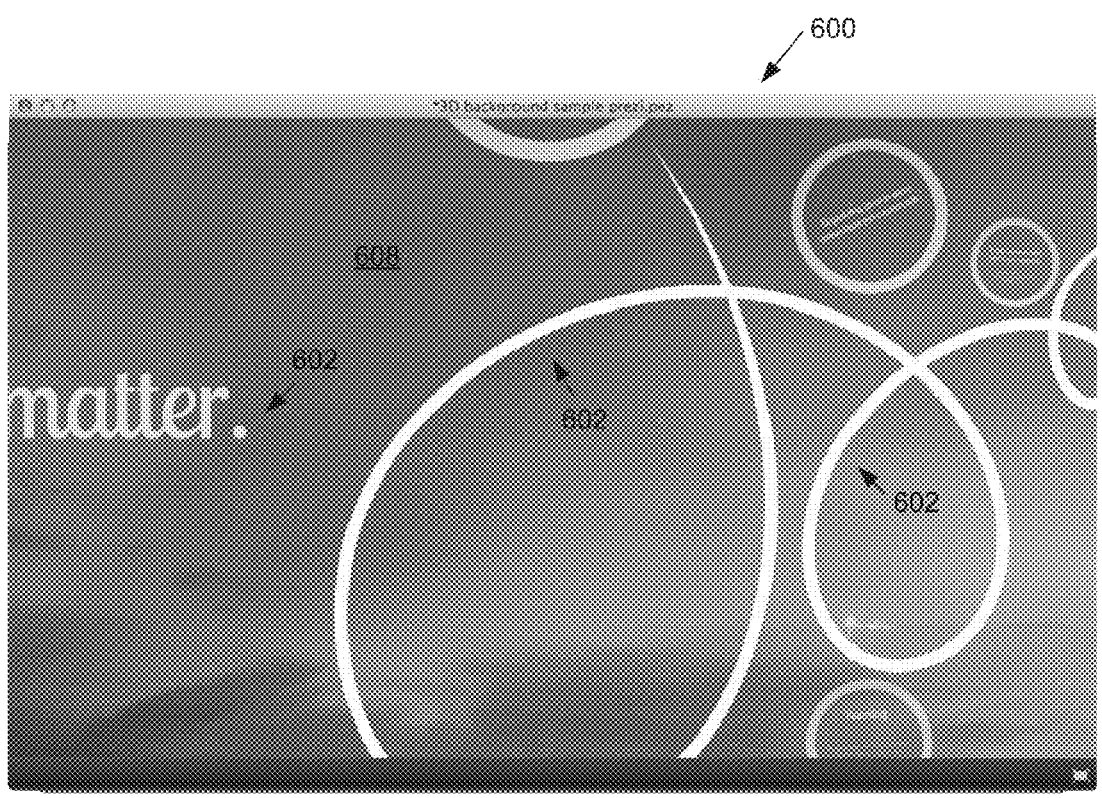
Figure 6I:
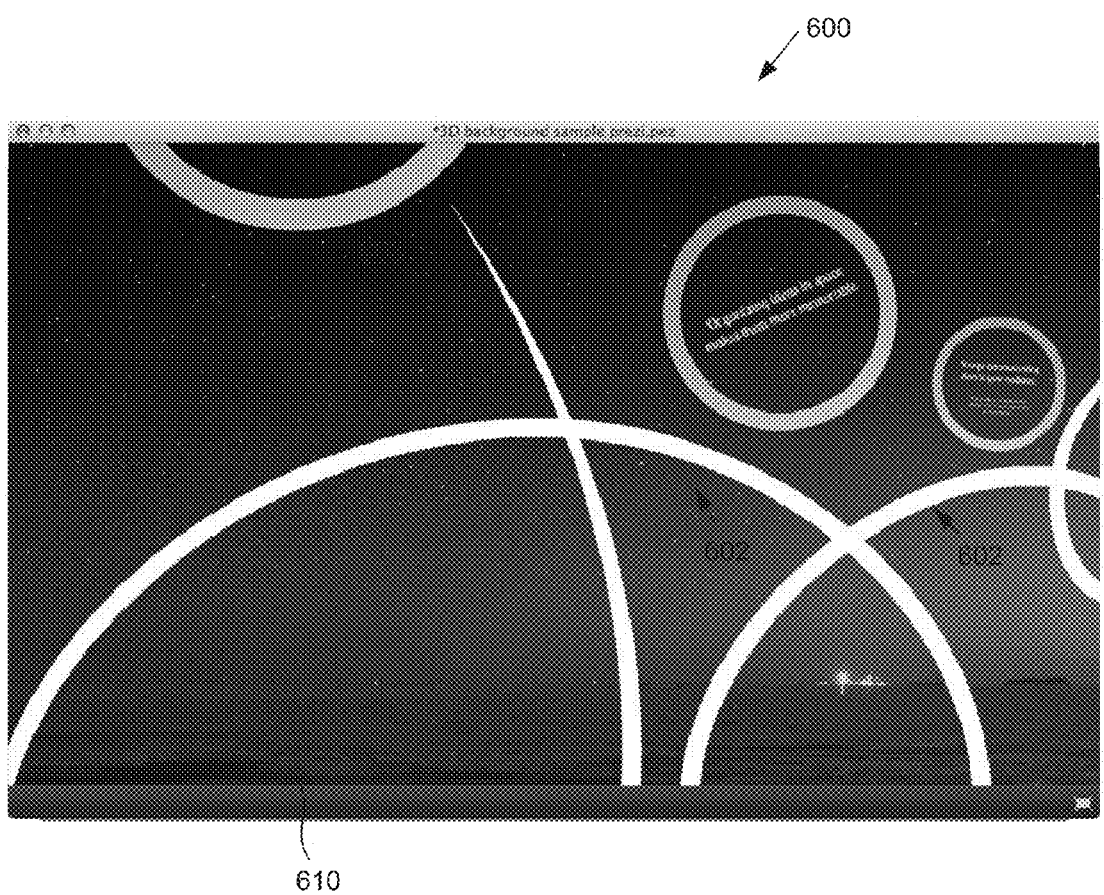
Figure 6J:
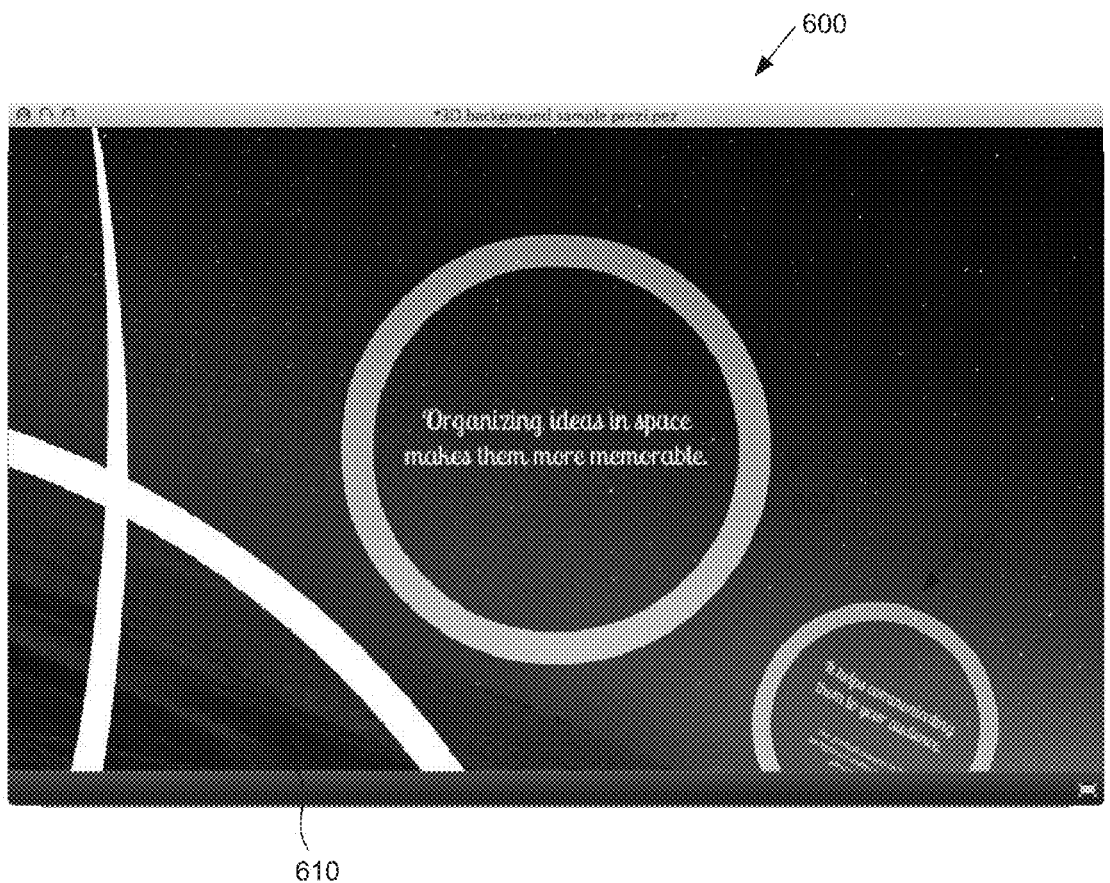
Figure 6K:
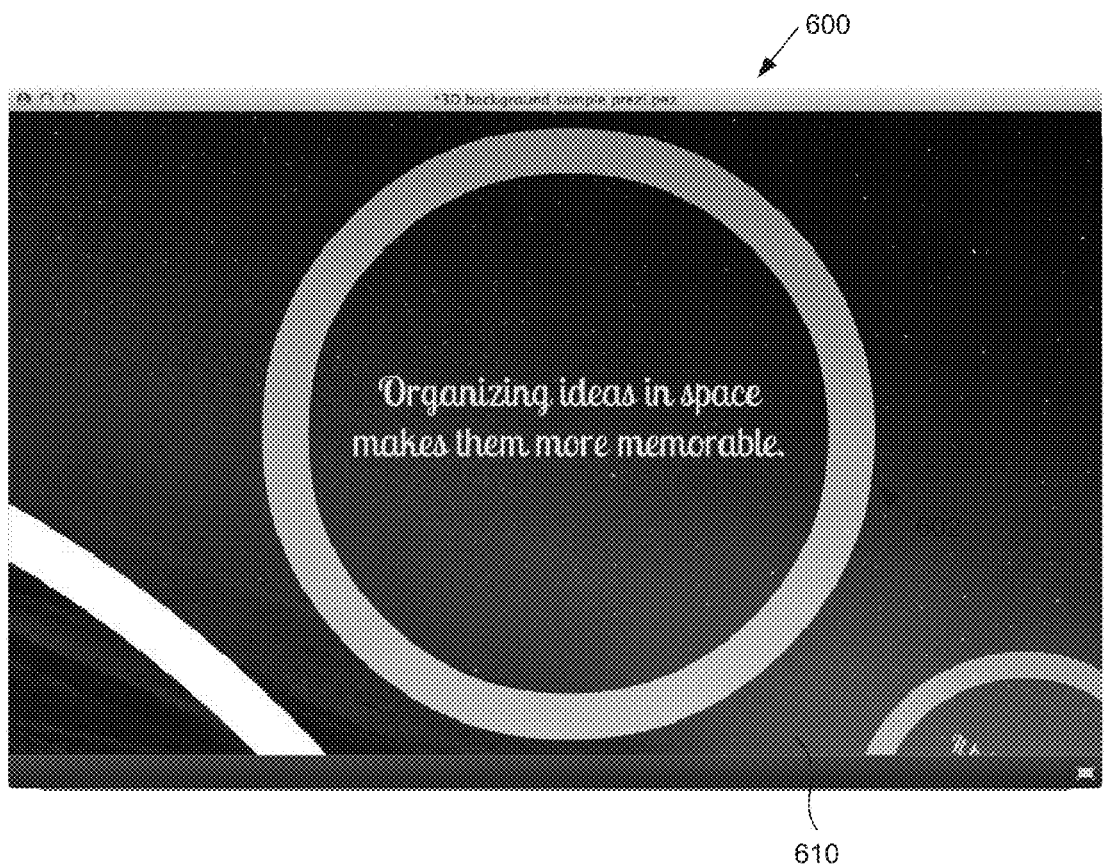
Figure 6L:
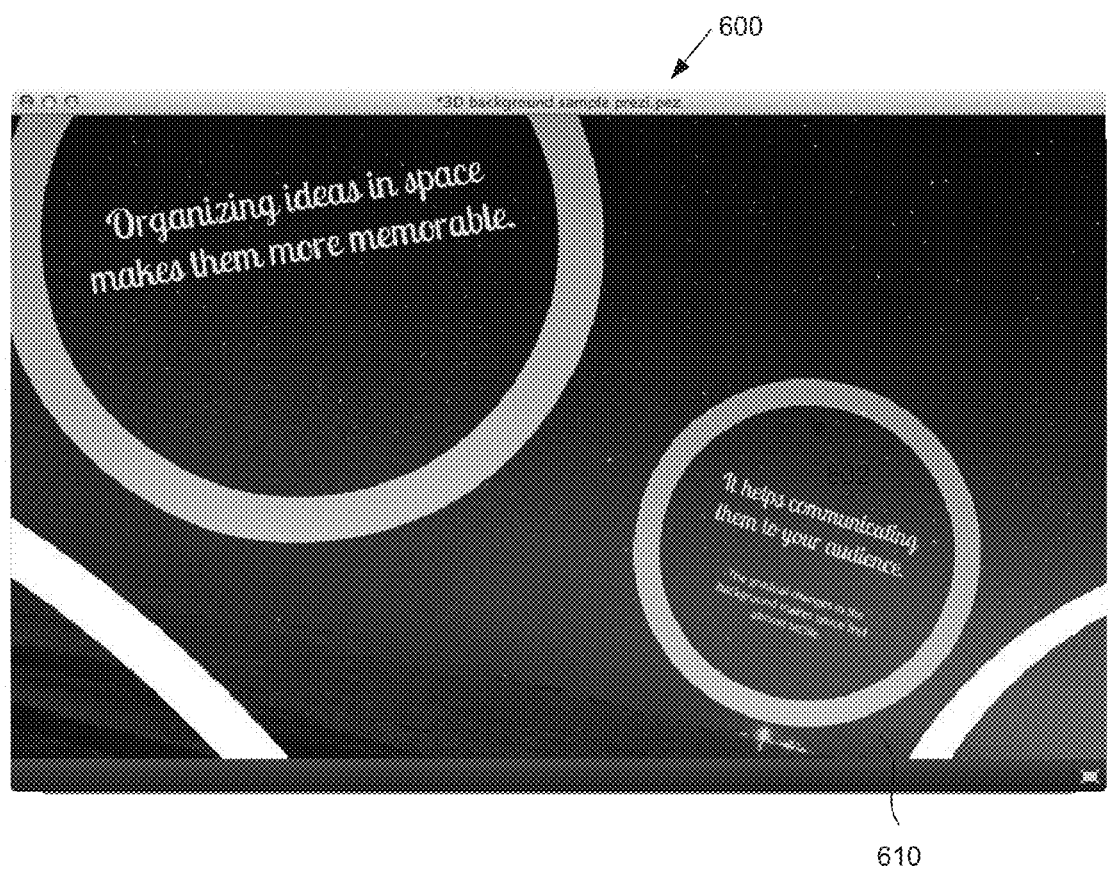

FIG. 6F illustrates an overview or initial 3D display of the canvas layer with the backgrounds 606, 610, and 612. As discussed above with respect to block 418, the viewing window 600 displays all of the display elements 602 included in the canvas layer (at the ms value, the minimum viewing window scale) and the background layers are centered relative to the active canvas area of the canvas layer. Only background 606 is visible within the viewing window 600 because it is initially set to 100% opacity. Note the different visual perspective between the display elements 602 of the canvas and the content of background 606, in which the content of background 606 appears to be further away (e.g., into the page) than the display elements 602 of the canvas even though both are displayed within a 2D space.

Figure 6M:
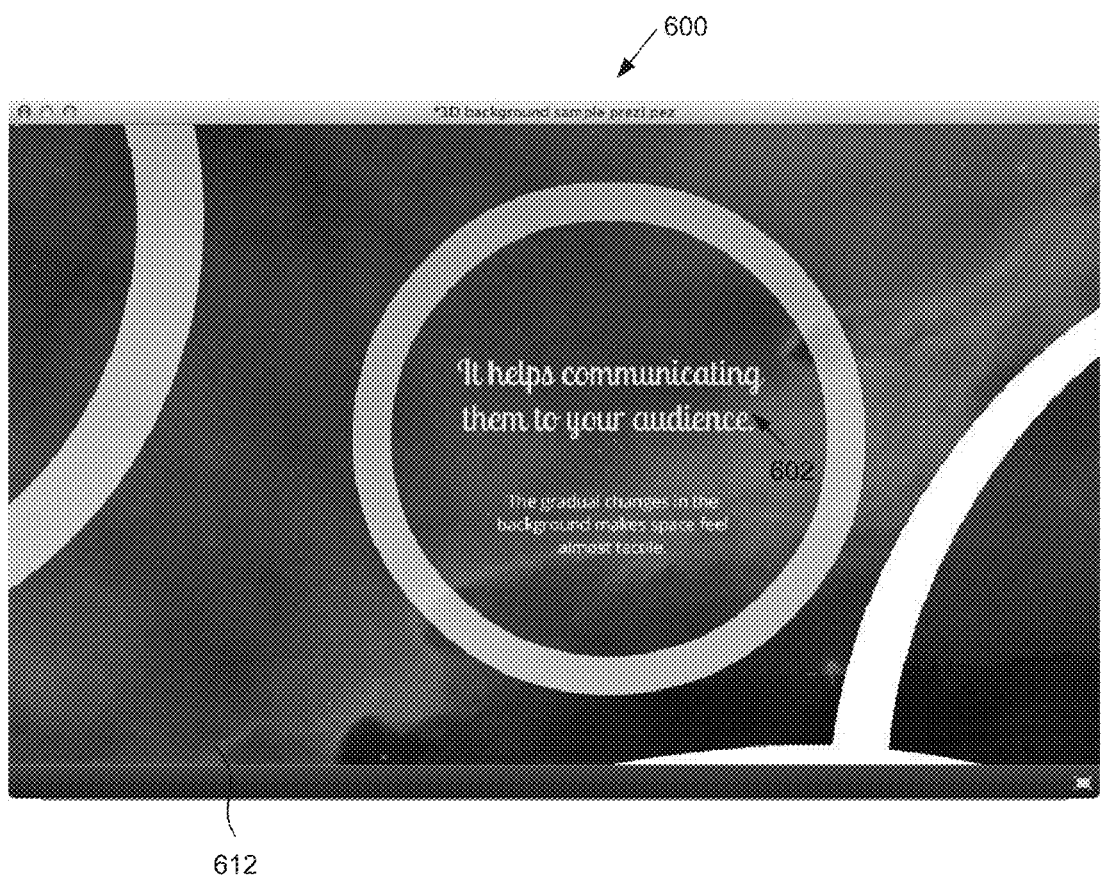
Figure 6N:
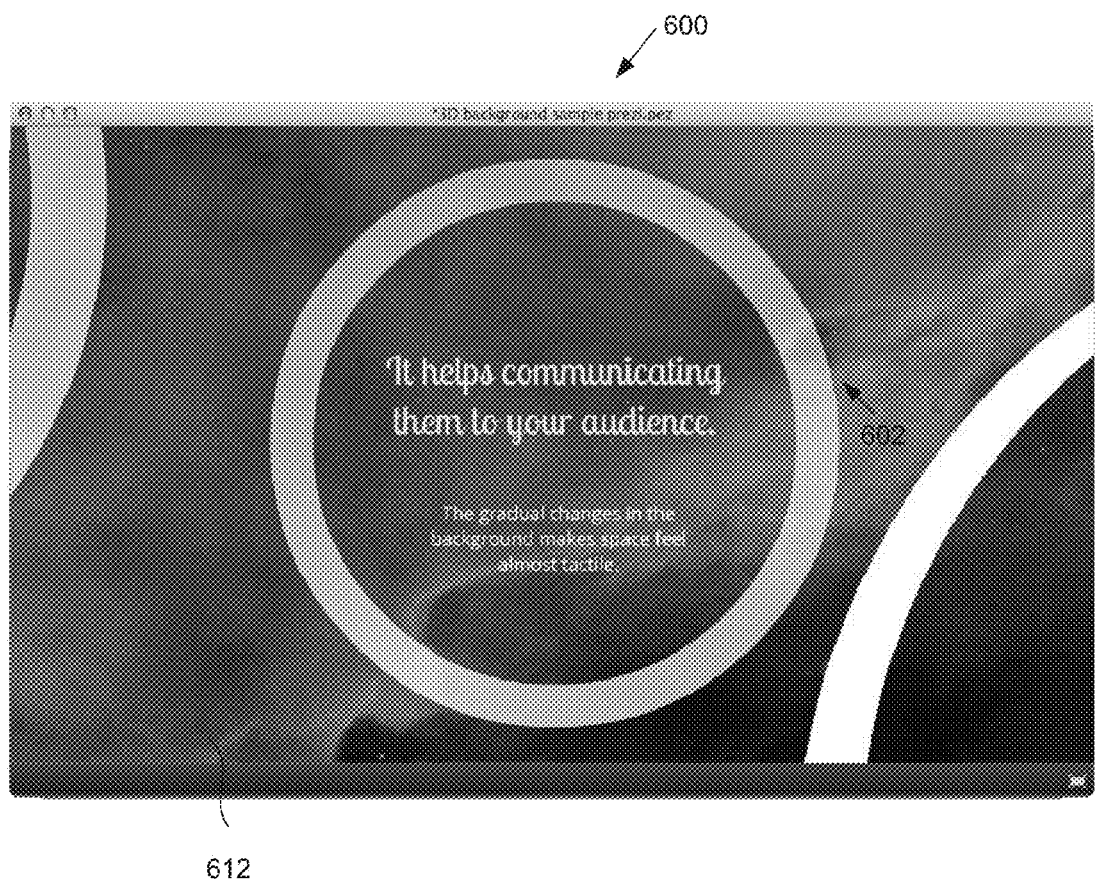
Figure 6O:
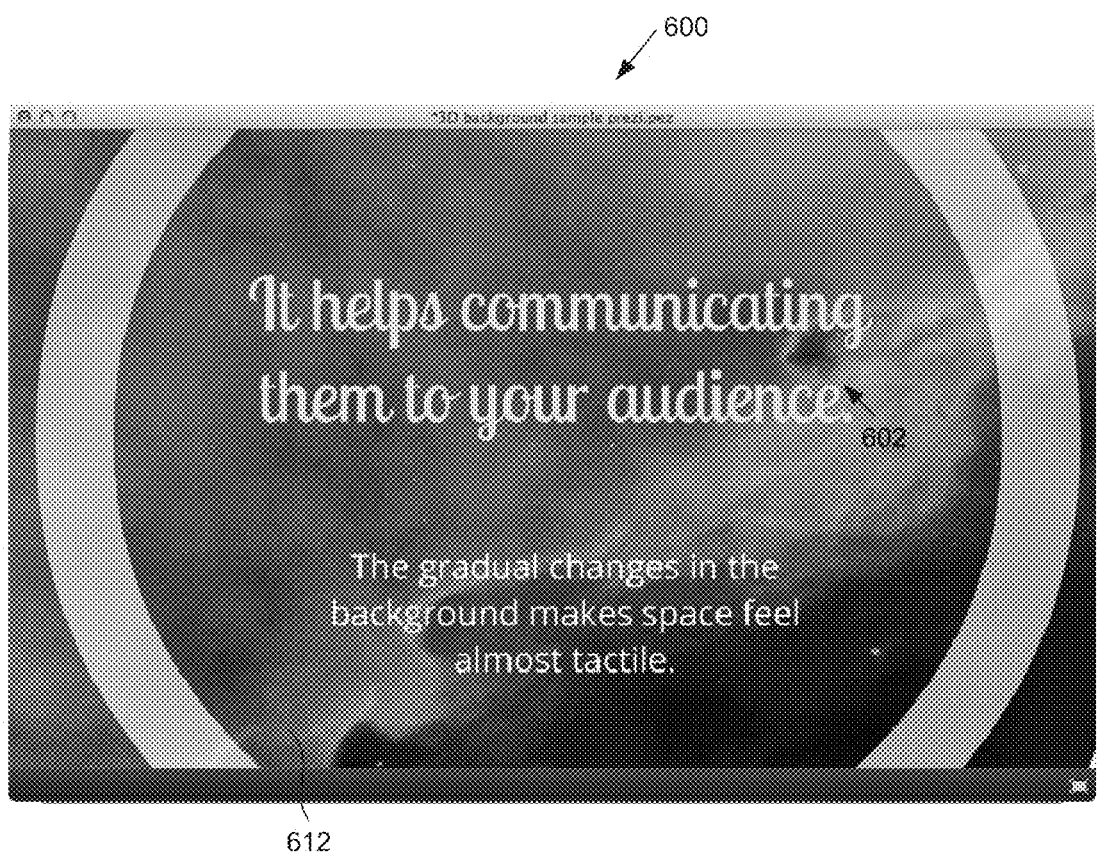

FIGS. 6G-6O illustrate 3D updates to the overview or initial 3D display of FIG. 6F, each of the display updates being in response to a zoom level change (e.g., block 420 of FIG. 4B), in particular, progressive zooming in by the user on a particular area of the canvas. Notice that the size or scale of the particular display elements 602 visible within the viewing window 600 increases as successive zooming in occurs (e.g., as cs value increases). And that the size or scale of the corresponding portion of the backgrounds 606, 610, 612 also increases as successive zooming in occurs. With progressive zooming in on a particular area of the canvas, background 606 fades (becomes more transparent) so that background 610 becomes more visible. For example, the visibility of background 606 in FIG. 6H transitioning to visibility of background 610 in FIG. 6I. As another example, when the user has sufficiently zoomed in, backgrounds 606 and 610 fade (become transparent) to the point where background 612 is visible, as shown in FIG. 6M.

Figure 6P:
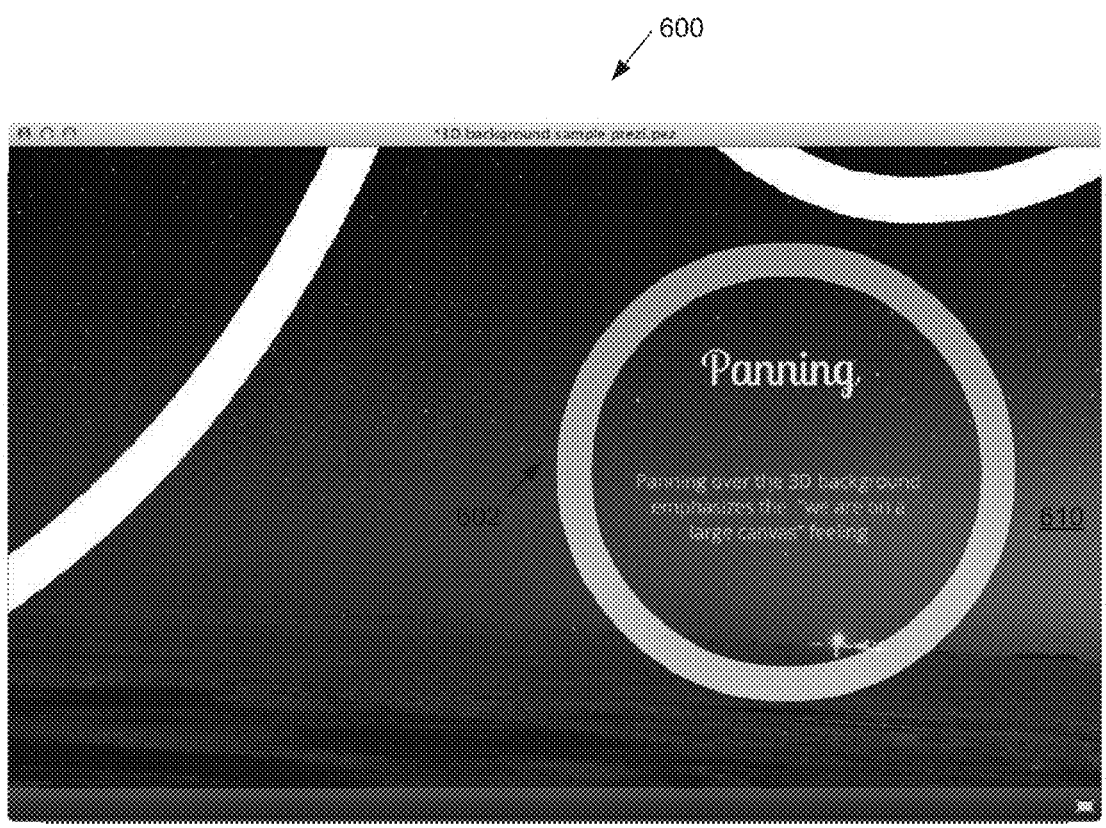
Figure 6Q:
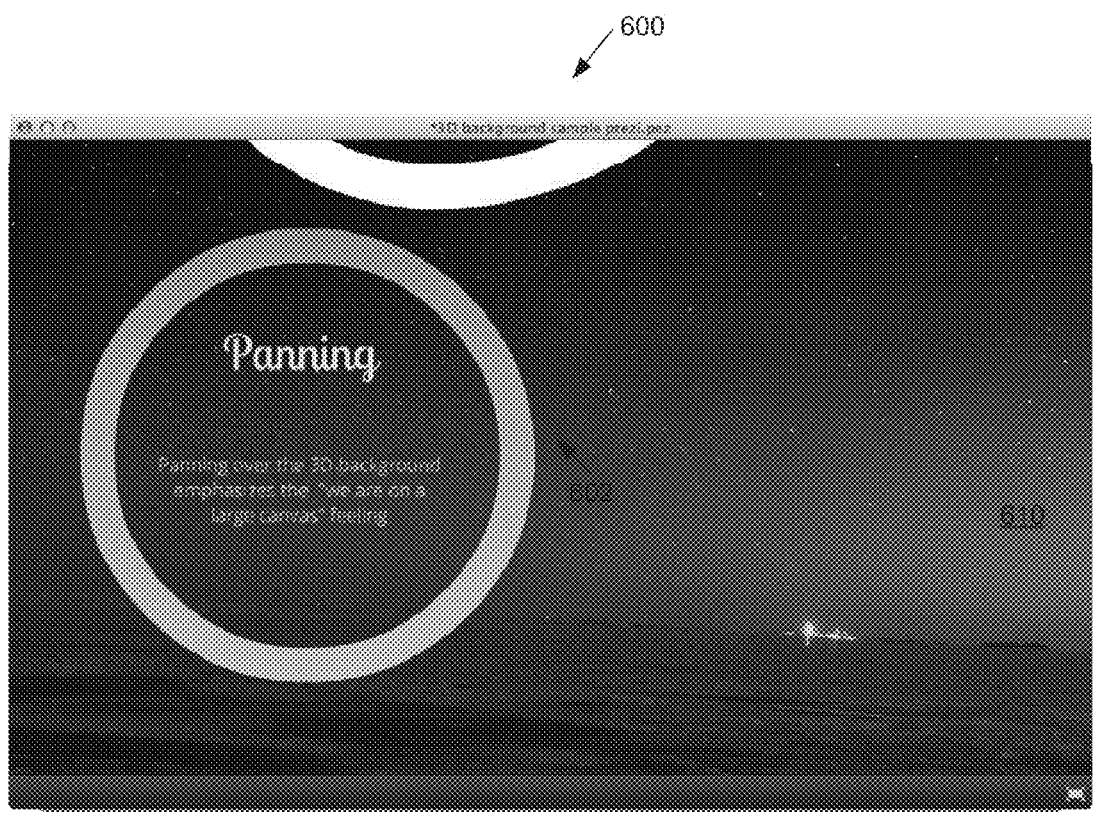

FIGS. 6P-6Q illustrate 3D updates relating to panning of the viewing window 600 relative to the canvas layer. The viewing window 600 has panned to the right (horizontally) relative to the canvas in FIG. 6Q in comparison to the viewing window 600 position shown in FIG. 6P.

In this manner, the content of a canvas its associated backgrounds are displayed together in parallax to create the perception of visual perspective or depth (3D effect) on a 2D screen. All backgrounds chosen by a user to be displayed with the canvas content in a ZUI environment is treated as being located in a different imaging plane from each other and from the canvas imaging plane. The background imaging planes are conceptually positioned behind the canvas imaging plane along a direction perpendicular to the plane of the viewing window within which the canvas and backgrounds are viewed by the user. Each of the background imaging plane is positioned a certain distance or depth from the canvas imaging plane, the distance or depth of each of the respective background imaging plane being different from each other. The further the distance of a given background imaging plane from the canvas imaging plane, the smaller the content included in that background imaging plane is rendered relative to the canvas content. When more than one background is displayed with a canvas, the transition or fading of content in a background imaging plane to the content in another background imaging plane is a function of the zoom level and the relative position of a given background imaging plane to all of the other background imaging planes.

As the user edits canvas content or changes views of the canvas in a ZUI environment—e.g., zooms in or out of the canvas content, pans across the canvas, or changes the height (vertical dimension) of the viewing window—embodiments of the present disclosure operate to automatically update the canvas content visible within the viewing window while properly maintaining the perception of visual perspective or depth for all of the backgrounds displayed with the canvas. For example, as the user zooms in/out of the canvas, the size or scale of the background content changes at a rate proportional to the rate of change in size or scale of the canvas content. As another example, as the user pans across the canvas, the background content is also proportionally panned. In another example, the size or scale of the background content and fading of the background content are functions of the height of the viewing window, and thus recalculated as the user changes the height of the viewing window.

Figure 7:
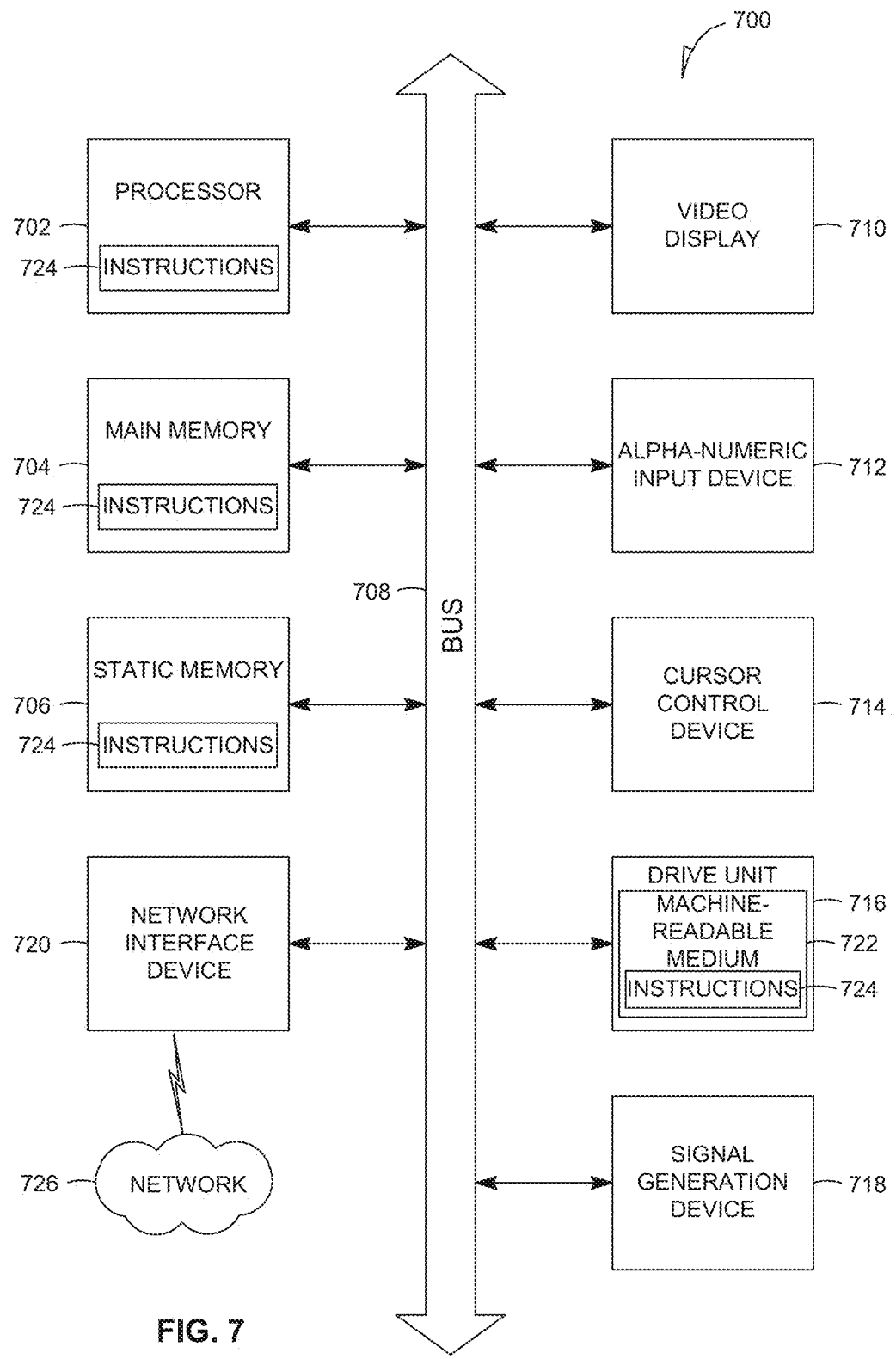
FIG. 7 illustrates a diagrammatic representation of a machine in the example form of a computer system within which a set of instructions is included, for causing the machine to perform any one or more of the methodologies of FIGS. 4A-4D according to some embodiments.

FIG. 7 shows a diagrammatic representation of a machine in the example form of a computer system 700 within which a set of instructions is included, for causing the machine to perform any one or more of the methodologies discussed herein, may be executed. The computer system 700 comprises, for example, any of the client devices 104, server 106, database 108, or database server 110. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a tablet, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., liquid crystal display (LCD), organic light emitting diode (OLED), touch screen, or a cathode ray tube (CRT)). The computer system 700 also includes an alphanumeric input device 712 (e.g., a physical or virtual keyboard), a cursor control device 714 (e.g., a mouse, a touch screen, a touchpad, a trackball, a trackpad), a disk drive unit 716, a signal generation device 718 (e.g., a speaker) and a network interface device 720.

The disk drive unit 716 includes a machine-readable medium 722 on which is stored one or more sets of instructions 724 (e.g., software) embodying any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for three-dimensional (3D) rendering of a canvas and at least a first background in a zooming user interface (ZUI) environment, the method comprising:
    displaying within a viewing window of the ZUI environment, at least a portion of a plurality of display elements included in the canvas and at least a portion of the first background in parallax, the first background represented as located a first distance behind the canvas, the first distance based on a minimum viewing window scale at which the plurality of display elements included in the canvas are simultaneously visible within the viewing window;
    receiving a user action taken on the viewing window that triggers a change in the displaying of the at least a portion of the plurality of display elements included in the canvas and the at least a portion of the first background;
    calculating, by at least one processor, a first transform value for the first background, the first transform value defining a scale of the first background relative to the canvas and positioning of the first background relative to the canvas in accordance with the received user action;
    calculating, by the at least one processor, a first transparency value for the first background, the first transparency value defining a degree of opacity of the first background; and updating the displaying of the at least a portion of the plurality of display elements included in the canvas and the at least a portion of the first background in response to the received user action, the canvas updated in accordance with the received user action and the first background updated in accordance with the first transform value and the first transparency value.

2. The method of claim 1, wherein the displaying of the at least a portion of the plurality of display elements included in the canvas and the at least a portion of the first background includes displaying at least a portion of a second background, the second background being represented as located a second distance behind the canvas, the second distance being greater than the first distance.

3. The method of claim 2, further comprising:
calculating a second transform value for the second background in response to the received user action, the second transform value defining a scale of the second background relative to the canvas and positioning of the second background relative to the canvas in accordance with the received user action;
calculating a second transparency value for the second background in response to the received user action, the second transparency value defining a degree of opacity of the second background; and
wherein the updating comprises updating the displaying of the at least a portion of the plurality of display elements included in the canvas, the at least a portion of the first background, and the at least a portion of the second background in response to the received user action, the second background updated in accordance with the second transform value and the second transparency value.

4. The method of claim 3, wherein the updating comprises providing a gradual transitioning effect between the first and second backgrounds based on the first and second transparency values.

5. The method of claim 2, wherein the plurality of display elements included in the canvas comprises a first display element that is larger than a second display element, more of the first background being displayed than the second background when the first display element is visible within the viewing window, and more of the second background being displayed than the first background when the second display element is visible within the viewing window.

6. The method of claim 1, wherein the user action comprises changing a viewing zoom level of a particular region of the canvas.

7. The method of claim 6, wherein the calculating of the first transform value comprises changing the scale of the first background at a rate that is proportionally smaller than changing a scale of the canvas.

8. The method of claim 1, wherein the user action comprises panning across the canvas.

9. The method of claim 8, wherein the calculating of the first transform value comprises changing the positioning of the first background at a rate that is proportionally smaller than changing positioning of the canvas.

10. The method of claim 1, wherein the user action comprises changing a height of the viewing window.

11. The method of claim 1, wherein the first transform value is a function of current position coordinates of the viewing window, a current viewing window scale, and a height of the viewing window.

12. The method of claim 1, wherein the first transform value comprises horizontal and vertical position coordinates in Cartesian space.

13. The method of claim 1, wherein the first transparency value is a function of a current viewing window scale, a height of the viewing window, and the minimum viewing window scale.

14. An apparatus, comprising:
at least one memory;
a screen;
at least one processor in communication with each of the memory and screen; and
one or more modules comprising instructions stored in the memory and executed by the processor to perform operations comprising:
providing a zooming user interface (ZUI) including a viewing window on the screen, the viewing window displaying at least a portion of a plurality of display elements included in a canvas and at least a portion of a first background in parallax, the first background represented as located a first distance behind the canvas, the first distance based on a minimum viewing window scale at which the plurality of display elements included in the canvas are simultaneously visible within the viewing window;
receiving a user action taken on the viewing window that triggers a change in the displaying of the at least a portion of the plurality of display elements included in the canvas and the at least a portion of the first background;
calculating a first transform value for the first background, the first transform value defining a scale of the first background relative to the canvas and positioning of the first background relative to the canvas in accordance with the received user action;
calculating a first transparency value for the first background, the first transparency value defining a degree of opacity of the first background; and
updating the displaying of the at least a portion of the plurality of display elements included in the canvas and the at least a portion of the first background in response to the received user action, the canvas updated in accordance with the received user action and the first background updated in accordance with the first transform value and the first transparency value.

15. The apparatus of claim 14, wherein the apparatus comprises a mobile device.

16. The apparatus of claim 14, wherein the memory includes a plurality of backgrounds, and wherein the processor receives selection of the first background by a user from among the plurality of backgrounds for the displaying of the at least a portion of the plurality of display elements included in the canvas and the at least a portion of the first background.

17. The apparatus of claim 14, wherein the processor receives the first background uploaded by a user.

18. The apparatus of claim 14, wherein the displaying of the at least a portion of the plurality of display elements included in the canvas and the at least a portion of the first background includes the screen displaying at least a portion of a second background, the second background being represented as located a second distance behind the canvas, the second distance being greater than the first distance.

19. The apparatus of claim 18, the one or more of the modules comprising the instructions stored in the memory and executed by the processor to perform operations further comprising:
calculating a second transform value for the second background in response to the received user action, the second transform value defining a scale of the second background relative to the canvas and positioning of the second background relative to the canvas in accordance with the received user action;

calculating a second transparency value for the second background in response to the received user action, the second transparency value defining a degree of opacity of the second background; and wherein the updating comprises updating the displaying of the at least a portion of the plurality of display elements included in the canvas, the at least a portion of the first background, and the at least a portion of the second background in response to the received user action, the second background updated in accordance with the second transform value and the second transparency value.

20. The apparatus of claim 18, wherein the plurality of display elements included in the canvas comprises a first display element that is larger than a second display element, more of the first background being displayed than the second background when the first display element is visible within the viewing window, and more of the second background being displayed than the first background when the second display element is visible within the viewing window.

21. The apparatus of claim 14, wherein the user action comprises changing a viewing zoom level of a particular region of the canvas, panning across the canvas, or changing a height of the viewing window.

22. The apparatus of claim 14, wherein the first transform value is a function of current position coordinates of the viewing window, a current viewing window scale, and a height of the viewing window.

23. The apparatus of claim 14, wherein the first transparency value is a function of a current viewing window scale, a height of the viewing window, and the minimum viewing window scale.

24. A non-transitory computer readable medium including instructions, when executed by a processor, causes the processor to perform operations comprising:

providing a zooming user interface (ZUI) including a viewing window, the viewing window displaying at least a portion of a plurality of display elements included in a canvas and at least a portion of a first background in parallax, the first background represented as located a first distance behind the canvas, the first distance based on a minimum viewing window scale at which the plurality of display elements included in the canvas are simultaneously visible within the viewing window;

receiving a user action taken on the viewing window that triggers a change in the displaying of the at least a portion of the plurality of display elements included in the canvas and the at least a portion of the first background;

calculating a first transform value for the first background, the first transform value defining a scale of the first background relative to the canvas and positioning of the first background relative to the canvas in accordance with the received user action;

calculating a first transparency value for the first background, the first transparency value defining a degree of opacity of the first background; and updating the displaying of the at least a portion of the plurality of display elements included in the canvas and the at least a portion of the first background in response to the received user action, the canvas updated in accordance with the received user action and the first background updated in accordance with the first transform value and the first transparency value.

25. The non-transitory computer readable medium of claim 24, wherein the displaying of the at least a portion of the plurality of display elements included in the canvas and the at least a portion of the first background includes displaying at least a portion of a second background, the second background being represented as located a second distance behind the canvas, the second distance being greater than the first distance.

26. The non-transitory computer readable medium of claim 25, further comprising:

calculating a second transform value for the second background in response to the received user action, the second transform value defining a scale of the second background relative to the canvas and positioning of the second background relative to the canvas in accordance with the received user action;

calculating a second transparency value for the second background in response to the received user action, the second transparency value defining a degree of opacity of the second background; and wherein the updating comprises updating the displaying of the at least a portion of the plurality of display elements included in the canvas, the at least a portion of the first background, and the at least a portion of the second background in response to the received user action, the second background updated in accordance with the second transform value and the second transparency value.

27. The non-transitory computer readable medium of claim 25, wherein the plurality of display elements included in the canvas comprises a first display element that is larger than a second display element, more of the first background being displayed than the second background when the first display element is visible within the viewing window, and more of the second background being displayed than the first background when the second display element is visible within the viewing window.

28. The non-transitory computer readable medium of claim 24, wherein the user action comprises changing a viewing zoom level of a particular region of the canvas, panning across the canvas, or changing a height of the viewing window.

* * * * *

UNITED STATES PATENT AND TRADEMARK OFFICE
CERTIFICATE OF CORRECTION

PATENT NO. : 9,128,585 B2
APPLICATION NO. : 13/907749
DATED : September 8, 2015
INVENTOR(S) : Weiner et al.

Page 1 of 1

It is certified that error appears in the above-identified patent and that said Letters Patent is hereby corrected as shown below:

Title page (71), in "Applicants", in column 1, line 4, delete "Laszlo" and insert --László--, therefor (72), in "Inventors", in column 1, line 4, delete "Laszlo" and insert --László--, therefor Signed and Sealed this
Thirty-first Day of May, 2016

Michelle K. Lee
*Director of the United States Patent and Trademark Office*